(12) United States Patent
Lee et al.

(10) Patent No.: US 11,239,024 B2
(45) Date of Patent: Feb. 1, 2022

(54) LENS MOVING APPARATUS, AND CAMERA MODULE AND OPTICAL DEVICE COMPRISING SAME

(71) Applicant: LG INNOTEK CO., LTD., Seoul (KR)

(72) Inventors: Jun Taek Lee, Seoul (KR); Seung Taek Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 436 days.

(21) Appl. No.: 16/338,238

(22) PCT Filed: Sep. 26, 2017

(86) PCT No.: PCT/KR2017/010606
§ 371 (c)(1),
(2) Date: Mar. 29, 2019

(87) PCT Pub. No.: WO2018/066861
PCT Pub. Date: Apr. 12, 2018

(65) Prior Publication Data
US 2020/0035408 A1    Jan. 30, 2020

(30) Foreign Application Priority Data

Oct. 5, 2016  (KR) .......... 10-2016-0128160
Oct. 5, 2016  (KR) .......... 10-2016-0128161
Oct. 7, 2016  (KR) .......... 10-2016-0129981

(51) Int. Cl.
| | |
|---|---|
| G02B 7/09 | (2021.01) |
| H01F 27/32 | (2006.01) |
| G02B 27/64 | (2006.01) |
| G03B 3/10 | (2021.01) |
| G03B 13/36 | (2021.01) |

(Continued)

(52) U.S. Cl.
CPC ............. *H01F 27/325* (2013.01); *G02B 7/09* (2013.01); *G02B 27/646* (2013.01); *G03B 3/10* (2013.01);

(Continued)

(58) Field of Classification Search
CPC ........ G02B 27/646; G02B 7/028; G02B 7/08; G02B 7/09; G02B 7/04; G03B 13/36;

(Continued)

(56) References Cited

U.S. PATENT DOCUMENTS

| | | | |
|---|---|---|---|
| 2008/0304154 A1* | 12/2008 | Lee .......... | G02B 7/08 359/557 |
| 2012/0014002 A1 | 1/2012 | Ollila et al. | |

(Continued)

FOREIGN PATENT DOCUMENTS

| | | |
|---|---|---|
| CN | 101666900 A | 3/2010 |
| CN | 102445811 A | 5/2012 |

(Continued)

OTHER PUBLICATIONS

Supplementary European Search Report dated Aug. 5, 2019 in European Application No. 17858656.6.

(Continued)

*Primary Examiner* — Balram T Parbadia
(74) *Attorney, Agent, or Firm* — Saliwanchik, Lloyd & Eisenschenk

(57) ABSTRACT

An embodiment of the present invention comprises: a housing; a bobbin disposed inside the housing; a first coil disposed on an outer circumferential surface of the bobbin; a magnet disposed on a side part of the housing to correspond to the first coil; a base disposed under the housing; a second coil, disposed on a lateral surface of the base, for generating an induced voltage by interacting with the first coil; and first to fourth elastic members coupled to the bobbin and the housing, and spaced apart from an upper surface of the base, wherein each of the first and second elastic members comprises: a first bonding part for bonding the first coil, and a first connection terminal for electrical connection to the outside; each of the third and fourth elastic (Continued)

members comprises: a second bonding part for bonding the second coil, and a second connection terminal for an electrical connection to the outside; and the second bonding part and the second connection terminal are disposed on different outer surfaces of the base.

20 Claims, 39 Drawing Sheets

(51) Int. Cl.
*H04N 5/225* (2006.01)
*H04N 5/232* (2006.01)

(52) U.S. Cl.
CPC ........... *G03B 13/36* (2013.01); *H04N 5/2252* (2013.01); *H04N 5/2253* (2013.01); *H04N 5/2254* (2013.01); *H04N 5/23212* (2013.01)

(58) Field of Classification Search
CPC .............. G03B 3/10; G03B 2205/0007; G03B 2205/0046; G03B 2205/0069; H01F 27/325; H02K 41/035; H02K 41/0356; H04N 5/2252; H04N 5/2253; H04N 5/2254; H04N 5/23212; H04N 5/225; H04N 5/232; H05K 3/34
See application file for complete search history.

(56) References Cited

U.S. PATENT DOCUMENTS

| 2012/0082442 A1* | 4/2012 | Kwon | H04N 5/2253 396/55 |
| 2014/0072289 A1* | 3/2014 | Lim | G02B 7/36 396/55 |
| 2015/0177479 A1* | 6/2015 | Lee | H02K 41/0356 359/824 |
| 2015/0323758 A1* | 11/2015 | Lee | G02B 7/08 359/824 |
| 2015/0365568 A1* | 12/2015 | Topliss | H02K 41/0356 348/360 |
| 2016/0048033 A1 | 2/2016 | Kim et al. | |

FOREIGN PATENT DOCUMENTS

| CN | 104937482 A | 9/2015 |
| CN | 105372785 A | 3/2016 |
| JP | 2010-286532 A | 12/2010 |
| JP | 2012-177754 A | 9/2012 |
| JP | 2015-118115 A | 6/2015 |
| JP | 2015-191213 A | 11/2015 |
| JP | 2015-197627 A | 11/2015 |
| KR | 10-2012-0051492 A | 5/2012 |
| KR | 10-2015-0097998 A | 8/2015 |
| KR | 10-2016-0037004 A | 4/2016 |
| KR | 10-2016-0059143 A | 5/2016 |
| WO | WO-2007/086659 A1 | 8/2007 |
| WO | WO-2014/100516 A1 | 6/2014 |

OTHER PUBLICATIONS

International Search Report in International Application No. PCT/KR2017/010606, filed Sep. 26, 2017.
Office Action dated Dec. 25, 2020 in Chinese Application No. 201780068222.9.

\* cited by examiner

LENS MOVING APPARATUS, AND CAMERA MODULE AND OPTICAL DEVICE COMPRISING SAME

CROSS-REFERENCE TO RELATED APPLICATIONS

This application is the U.S. national stage application of International Patent Application No. PCT/KR2017/010606, filed Sep. 26, 2017, which claims the benefit under 35 U.S.C. § 119 of Korean Application Nos. 10-2016-0128160, filed Oct. 5, 2016; 10-2016-0128161, filed Oct. 5, 2016; and 10-2016-0129981, filed Oct. 7, 2016; the disclosures of each of which are incorporated herein by reference in their entirety.

TECHNICAL FIELD

Embodiments relate to a lens moving apparatus and to a camera module and an optical device including the same.

BACKGROUND ART

It is difficult to apply the technology of a voice coil motor (VCM) used in a conventional camera module to an ultra-small camera module while still realizing low power consumption thereof, and thus research has been actively conducted in relation thereto.

There is increasing demand for, and production of, electronic products such as smart phones and cellular phones equipped with cameras. Cameras for cellular phones have been increasing in resolution and decreasing in size, and accordingly, an actuator therefor is also becoming smaller, larger in diameter, and more multi-functional. In order to realize a high-resolution cellular phone camera, improvement in the performance of the cellular phone camera and additional functions, such as auto-focusing, shutter shaking inhibition, and zooming in and out, are required.

DISCLOSURE

Technical Problem

Embodiments provide a lens moving apparatus, which is capable of inhibiting an electrical short between a second coil and a cover member and is capable of increasing coupling force between the cover member and a housing using an adhesive member, and a camera module and an optical device including the same.

Embodiments provide a lens moving apparatus, which is capable of inhibiting disconnection of the second coil for generating an inductive voltage and is capable of securing a resistance value of the second coil for temperature compensation, and a camera module and an optical device including the same.

Technical Solution

A lens moving apparatus according to an embodiment includes a housing, a bobbin disposed in the housing, a first coil disposed on an outer circumferential surface of the bobbin, a magnet disposed on a side portion of the housing, the magnet being disposed corresponding to the first coil, a base disposed under the housing, a second coil disposed on an outer surface of the base, the second coil being configured to generate an inductive voltage due to interaction with the first coil, and first to fourth elastic members coupled to the bobbin and the housing, the first to fourth elastic members being disposed so as to be spaced apart from each other on an upper surface of the base, wherein each of the first and second elastic members includes a first bonding portion for bonding to the first coil and a first connection terminal for electric connection to the outside, each of the third and fourth elastic members includes a second bonding portion for bonding to the second coil and a second connection terminal for electric connection to the outside, and the second bonding portion and the second connection terminal are disposed on different outer surfaces of the base.

The base may include side portions and a corner portion disposed between two adjacent ones of the side portions, and each of the second bonding portion and the second connection terminal may be disposed on a corresponding one of outer surfaces of two side portions adjacent to the corner portion.

Each of the first to fourth elastic members may include an inner frame coupled to the bobbin, an outer frame coupled to the housing, and a connection portion connecting the inner frame and the outer frame to each other, the first bonding portion may be disposed at the inner frame, and the second bonding portion and the first and second connection terminals may be disposed at the outer frame.

Each of the second bonding portion and the first and second connection terminals may be bent and extend from the outer frame toward the base and may be disposed on the outer surface of the base.

The base may have a groove formed in the outer surface thereof to allow the second coil to be disposed therein, and the second bonding portion may be disposed on a region of the outer surface of the base, which is located above the groove.

The first and second connection terminals may extend to another region of the outer surface of the base, which is located below the groove.

The base may have first indented portions formed in the outer surface thereof to allow the first and second connection terminals to be respectively disposed therein, and the base may have a second indented portion formed in the outer surface thereof to allow the second bonding portion to be disposed therein.

The first connection terminal of each of the first and second elastic members may be disposed on a first outer surface of the base, the second connection terminal of each of the third and fourth elastic members may be disposed on a second outer surface of the base, and the first outer surface of the base and the second outer surface of the base may be located opposite each other.

The lens moving apparatus may further include a cover member including an upper plate and side plates connected to the upper plate, the cover member being coupled to the housing, and a sealing member disposed between each of the side plates of the cover member and the housing. The housing may include side portions disposed at positions corresponding to the side plates of the cover member and an outer protruding portion formed at an outer surface of each of the side portions, and the outer protruding portion may protrude from the outer surface of each of the side portions in a direction from an inner surface of each of the side portions toward the outer surface thereof and may protrude from the lower end of each of the side portions toward the base.

The housing may include an indented portion formed in an outer surface of the outer protruding portion to allow the sealing member to be injected therein, and an inner protruding portion provided on an inner surface of the outer protruding portion at a position corresponding to the indented portion.

Advantageous Effects

Embodiments may inhibit an electrical short between the second coil and the cover member and may increase coupling force between the cover member and the housing using an adhesive member.

In addition, embodiments may inhibit disconnection of the second coil, may secure a resistance value of the second coil for temperature compensation, and may improve productibility of a mold for forming the base and injection moldability thereof.

DESCRIPTION OF DRAWINGS

FIG. 30b illustrates a cross-sectional view of the first connection terminal taken in the direction AB in FIG. 30a.

FIG. 31 illustrates a cross-sectional view of another example of the first connection terminal shown in FIG. 30a.

MODE FOR INVENTION

Figure 1:
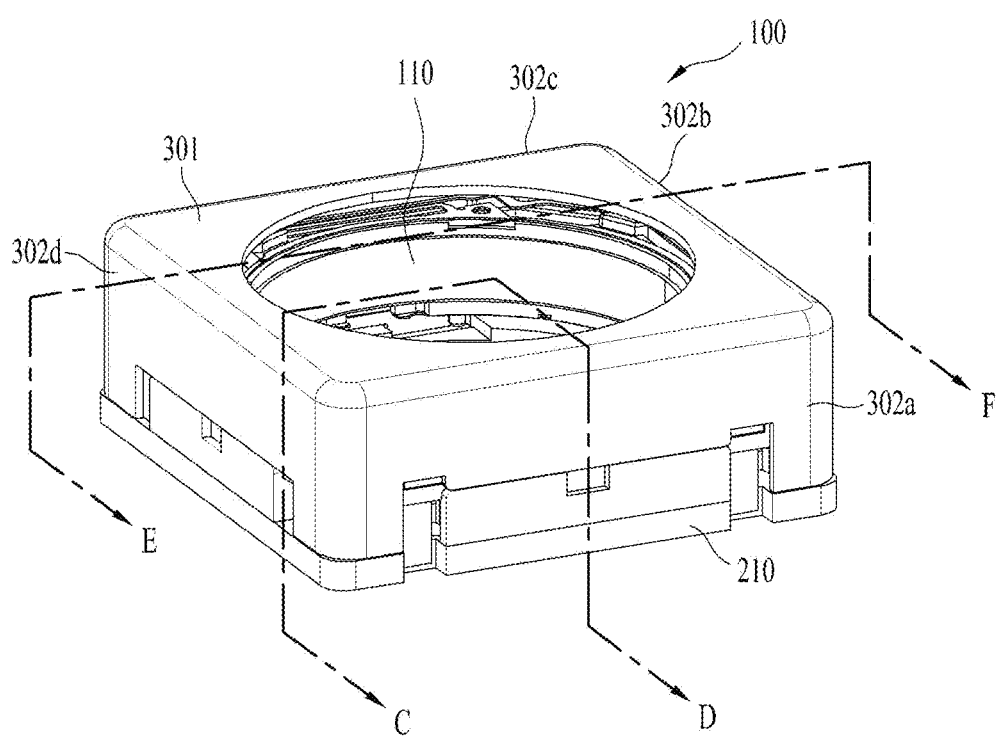
FIG. 1 illustrates a perspective view of a lens moving apparatus according to an embodiment.

Hereinafter, embodiments will become apparent with reference to the attached drawings and the description related thereto. In the description of the embodiments, it will be understood that when an element, such as a layer (film), a region, a pattern or a structure, is referred to as being "on" or "under" another element, such as a substrate, a layer (film), a region, a pad or a pattern, the term "on" or "under" means that the element is "directly" on or under another element or is "indirectly" formed such that an intervening element may also be present. In addition, it will also be understood that the criteria of "on" or "under" is on the basis of the drawings. In addition, the same reference numerals will denote the same elements via the description of the drawings.

Hereinafter, a lens moving apparatus according to the embodiments will be described with reference to the accompanying drawings. For convenience of description, the lens moving apparatus according to the embodiments will be described using a Cartesian coordinate system (x, y, z), but may be described using any other coordinate system, and the embodiments are not limited as to the coordinate system. In the drawings, an x-axis and a y-axis are directions perpendicular to a z-axis, which is an optical-axis direction. The z-axis direction, which is the optical-axis (OA) direction, may be referred to as a "first direction", the x-axis direction may be referred to as a "second direction", and the y-axis direction may be referred to as a "third direction".

A "hand-tremor compensation device" used in a small-sized camera module mounted in a mobile device, such as a smartphone or a tablet PC, is a device configured to inhibit the outline of a captured image from being blurred due to vibration caused by the shaking of a user's hand when the image is captured.

In addition, an "auto-focusing device" is a device for automatically focusing an image of a subject on the surface of an image sensor. The hand-tremor compensation device and the auto-focusing device may be configured in various manners. A lens moving apparatus according to the embodiments may perform an auto-focusing operation by moving a lens in the first direction.

Figure 2:
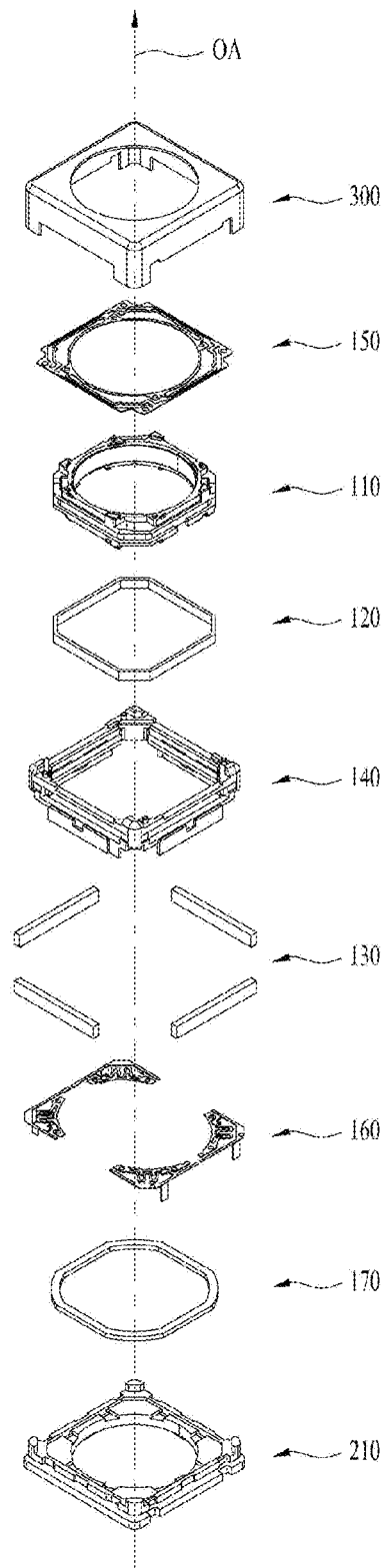
FIG. 2 illustrates an exploded perspective view of the lens moving apparatus shown in FIG. 1.
Figure 3:
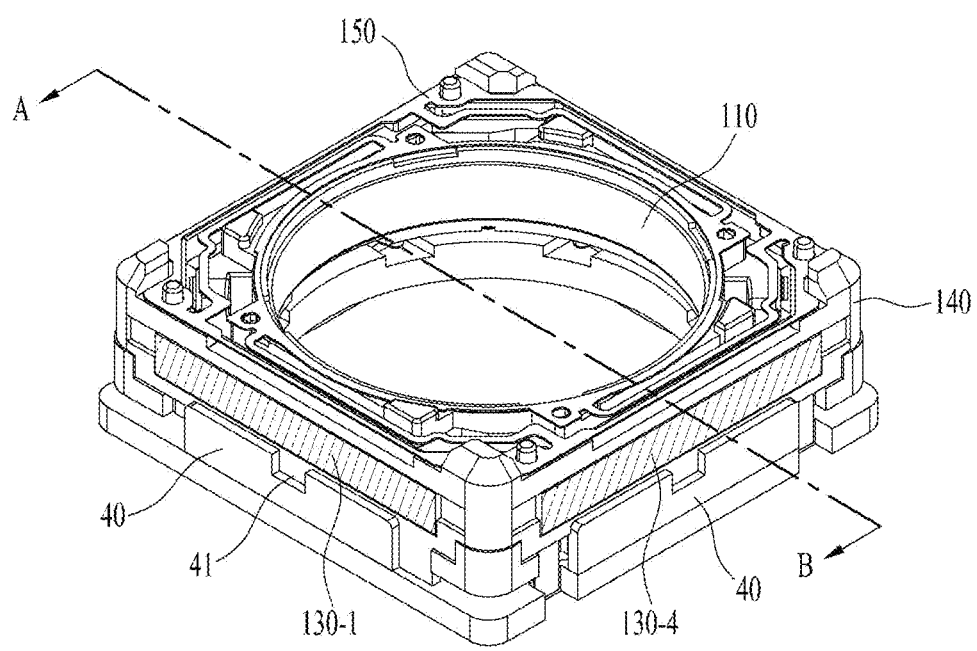
FIG. 3 illustrates an assembled perspective view of the lens moving apparatus excluding a cover member of FIG. 1.

FIG. 1 illustrates a perspective view of a lens moving apparatus 100 according to an embodiment, FIG. 2 illustrates an exploded perspective view of the lens moving apparatus 100 shown in FIG. 1, and FIG. 3 illustrates an assembled perspective view of the lens moving apparatus 100 excluding a cover member 300 of FIG. 1.

Referring to FIGS. 1 to 3, the lens moving apparatus 100 includes a bobbin 110, a first coil 120, a magnet 130, a housing 140, an upper elastic member 150, a lower elastic member 160, a second coil 170, a base 210, and a cover member 300.

First, the cover member 300 will be described.

The cover member 300 accommodates the bobbin 110, the first coil 120, the magnet 130, the housing 140, the upper elastic member 150, the lower elastic member 160, and the second coil 170 in an accommodating space defined between the cover member and the base 210.

The cover member 300 may take the form of a box having an open bottom, an upper plate 301 and side plates 302, and the lower ends of the side plates 302a to 302d of the cover member 302 may be coupled to outer protruding portions 40 of the housing 140. The upper plate of the cover member 300 may have a polygonal shape, for example, a rectangular shape, an octagonal shape, or the like.

The cover member 300 may have a hollow region formed in the upper plate 301 thereof to expose a lens (not illustrated), which is coupled to the bobbin 110, to external light. In addition, the hollow region in the cover member 300 may be additionally provided with a window formed of a light-transmitting material in order to inhibit foreign substances, such as dust or moisture, from entering the inside of a camera module.

The cover member 300 may be formed of a nonmagnetic material such as SUS in order to inhibit the cover member from adhering to the magnet 130, but may be formed of a magnetic material to serve as a yoke.

Next, the bobbin 110 will be described.

Figure 4A:
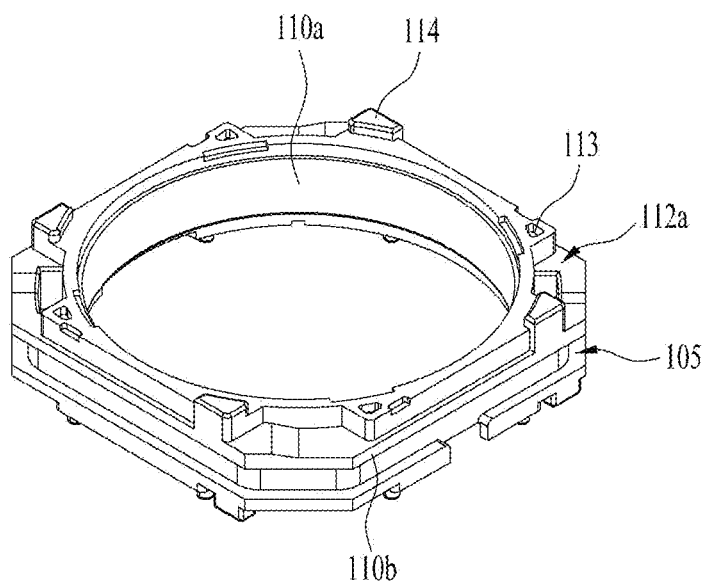
FIG. 4a is a first perspective view of the bobbin shown in FIG. 1.
Figure 4B:
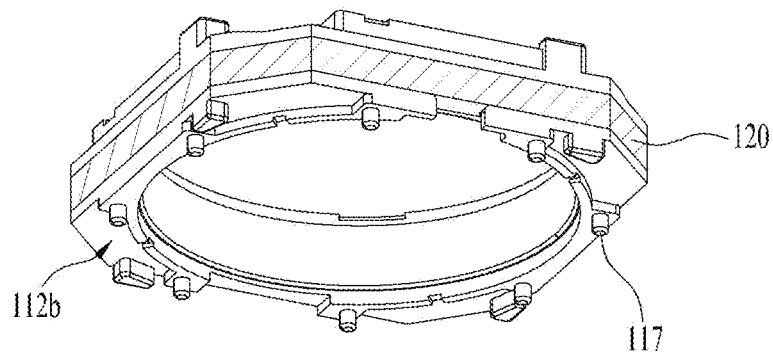
FIG. 4b is a coupled perspective view of the bobbin and the first coil shown in FIG. 1.

FIG. 4a is a first perspective view of the bobbin 110 shown in FIG. 1, and FIG. 4b is a coupled perspective view of the bobbin 110 and the first coil 120 shown in FIG. 1.

Referring to FIGS. 4a and 4b, the bobbin 110 is located inside the housing 140 and is movable in the first direction via electromagnetic interaction between the coil 120 and the magnet 130.

A lens (not illustrated) may be directly coupled to an inner circumferential surface 110a of the bobbin 110, without limitation thereto. For example, the bobbin 110 may include a lens barrel (not illustrated) in which at least one lens is provided, and the lens barrel may be coupled inside the bobbin 110 in any of various manners.

The bobbin 110 may have a hollow region for mounting the lens or the lens barrel. The hollow region of the bobbin 110 may have the same shape as the lens or lens barrel to be mounted therein, and may have, for example, a circular shape, an elliptical shape, or a polygonal shape, without limitation thereto.

The bobbin 110 may include at least one coupling recess or coupling protrusion 113, which is disposed on the upper surface thereof and is coupled and secured to an inner frame 151 of the upper elastic member 150, and at least one coupling protrusion 117, which is disposed on the lower surface thereof and is coupled and secured to an inner frame 161 of the lower elastic member 160.

The bobbin 110 may have an upper avoidance groove 112a formed in a region of the upper surface thereof corresponding to or aligned with a frame connection portion 153 of the upper elastic member 150. In addition, the bobbin 110 may have a lower avoidance groove 112b formed in a region of the lower surface thereof corresponding to or aligned with a connection portion 163 of the lower elastic member 160. When the bobbin 110 moves in the first direction, spatial interference between the connection portions 153 and 163 of the upper and lower elastic members 150 and 160 and the bobbin 110 may be inhibited by the upper avoidance groove 112a and the lower avoidance groove 112b in the bobbin 110, and thus the connection portions 153 and 163 of the upper and lower elastic members 150 and 160 may be elastically deformed more easily.

In another embodiment, the connection portion of the upper elastic member and the bobbin are designed so as to avoid interference therebetween, in which case the upper avoidance groove and/or the lower avoidance groove in the bobbin may not be provided.

The bobbin 110 may have at least one groove 105 formed in the outer circumferential surface 110b thereof, in which the first coil 120 is disposed.

The first coil 120 may be placed or seated in the groove 105 in the bobbin 110. Alternatively, the first coil 120 may be directly wound in the groove 105 in the bobbin 110 so as to rotate in a clockwise or counterclockwise direction about the optical axis OA.

The shape and number of grooves 105 in the bobbin 110 may correspond to the shape and number of coils disposed on the outer circumferential surface of the bobbin 110. In another embodiment, the bobbin 110 may not have a coil seating groove, and the first coil 120 may be directly wound around and secured to the outer circumferential surface of the bobbin 110 having no groove.

Next, the first coil will be described.

The first coil 120 is disposed on the outer circumferential surface 110b of the bobbin 110 and electromagnetically interacts with the magnet 130 disposed on the housing 140.

A driving signal may be applied to the first coil 120 in order to generate an electromagnetic force due to the electromagnetic interaction between the first coil 120 and the magnet 130. The driving signal applied to the first coil may include an alternating current signal, or may include an alternating current signal and a direct current signal. For example, the alternating current signal may be a sinusoidal signal or a pulse signal (e.g. a PWM signal).

The bobbin 110, which is elastically supported by the upper and lower elastic members 150 and 160, may be moved in the first direction by the electromagnetic force due to the electromagnetic interaction between the first coil 120 and the magnet 130. The movement of the bobbin 110 in the first direction may be controlled by controlling the electromagnetic force, whereby an auto-focusing function may be performed.

The first coil 120 may be wound around the outer circumferential surface 110b of the bobbin 110 so as to rotate in a clockwise or counterclockwise direction about the optical axis. For example, the first coil 120 may be disposed in or wound around the groove 105 formed in the outer circumferential surface 110b of the bobbin 110.

For example, the first coil 120 may have a closed loop shape, e.g. a ring shape.

In another embodiment, the first coil 120 may be implemented in the form of a coil ring that is wound in a clockwise or counterclockwise direction about an axis perpendicular to the optical axis, and the number of coil rings may be the same as the number of magnets 130, without limitation thereto.

The first coil 120 may be electrically connected to at least one of the upper elastic member 150 or the lower elastic member 160. The driving signal may be applied to the first coil 120 through at least one of the upper elastic member 150 or the lower elastic member 160.

Next, the housing 140 will be described.

Figure 5:
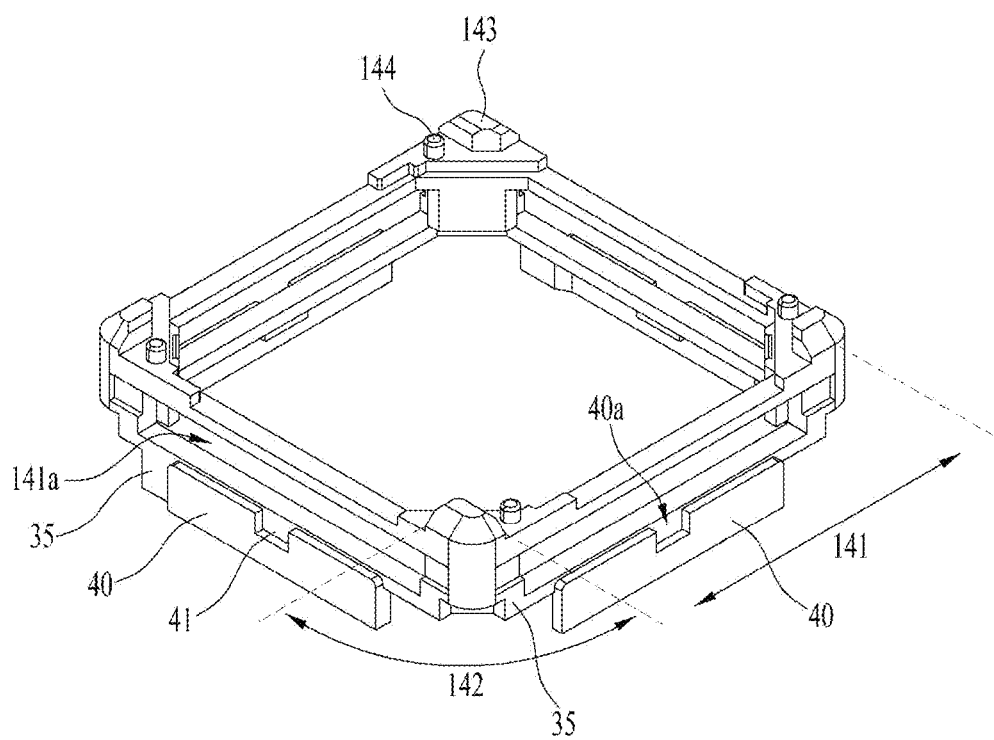
FIG. 5 illustrates a perspective view of the housing shown in FIG. 1.
Figure 6:
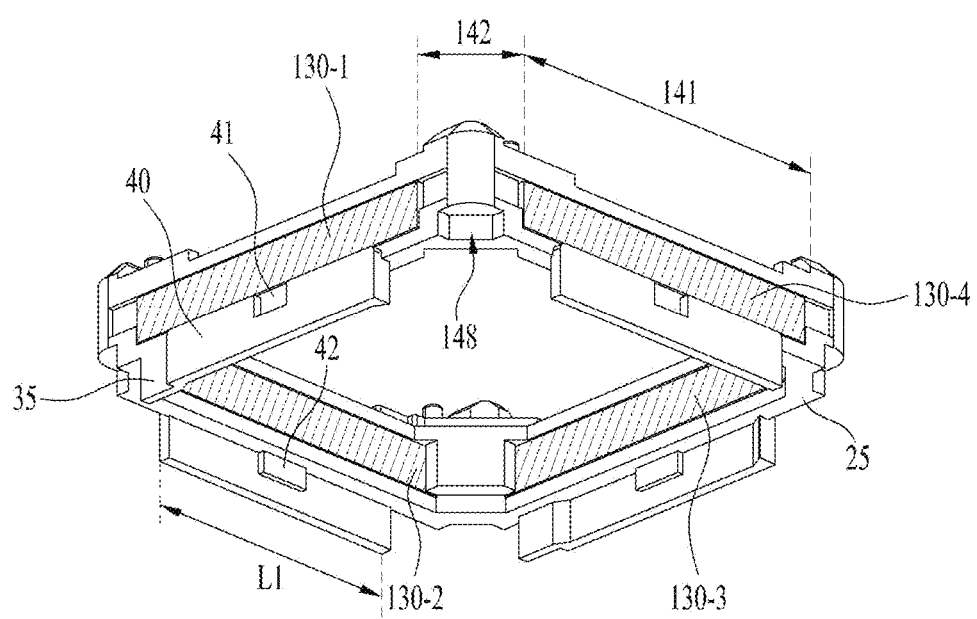
FIG. 6 illustrates a coupled perspective view of the housing and the magnet.

FIG. 5 illustrates a perspective view of the housing 140 shown in FIG. 1, and FIG. 6 illustrates a coupled perspective view of the housing 140 and the magnet 130.

Referring to FIGS. 5 and 6, the housing 140 supports the magnet 130 and accommodates the bobbin 110 therein so as to allow the bobbin 110 to be moved in the first direction.

The housing 140 may have a hollow column shape overall, and may include first side portions 141 and second side portions 142, which form a hollow region therein.

For example, the housing 140 may include the side portions 141 and 142, which form a polygonal (e.g. rectangular or octagonal) or circular hollow region therein. The upper surfaces of the side portions 141 and 142 may define the upper surface of the housing 140.

For example, the housing 140 may include first side portions 141, which are spaced apart from each other, and second side portions 142, which are spaced apart from each other.

For example, the first side portions 141 of the housing 140 may be disposed at positions corresponding to the side plates of the cover member 300.

For example, the length of each of the first side portions 141 of the housing 140 may be greater than the length of each of the second side portions 142. For example, the first side portions 141 of the housing 140 may correspond to the sides of the housing 140, and the second side portions 142 of the housing 140 may correspond to the corners of the housing 140.

The first side portion 141 of the housing 140 may be referred to as a "side portion", and the second side portion 142 of the housing 140 may be referred to as a "corner portion".

The magnet 130 may be disposed or installed on the first side portions 141 of the housing 140. For example, each of the first side portions 141 of the housing 140 may be provided therein with a groove 141a, in which the magnet 130 is seated, disposed or secured. As illustrated in FIG. 5, the groove 141a for the magnet is formed through the first side portion, without limitation thereto. The groove 141a may be formed such that it is recessed from the outer surface of the first side portion.

The housing 140 may include a first stopper 143, which protrudes from the upper surface thereof.

The first stopper 143 of the housing 140 functions to inhibit collision between the cover member 300 and the housing 140. The first stopper 143 may inhibit the upper surface of the housing 140 from directly colliding with the upper inner surface of the cover member 300 due to external shocks.

In addition, the housing 140 may include an upper frame support protrusion 144, which is formed on the upper surface thereof so as to be coupled with an outer frame 152 of the upper elastic member 150. The housing 140 may include a lower frame support protrusion (not illustrated), which is formed on the lower surface thereof so as to be coupled with an outer frame 162 of the lower elastic member 160.

In addition, the housing 140 may have a lower guide recess 148, which is formed in each of the lower portions of the second side portions 141 and 142 thereof. A guide member 216 of the base 210 may be inserted into, fastened into or coupled to the lower guide recess 148. The lower guide recess 148 of the housing 140 and the guide member 216 of the base 210 may be coupled to each other via an adhesive member 12 (refer to FIG. 11), whereby the housing 140 may be coupled to the base 210.

The lower ends 25 (refer to FIG. 6) of the first side portions 141 of the housing 140, which is coupled to the base 210, may be in contact with the edges of the upper surfaces of the upper end portions 210b of the base 210.

The housing 140 may include outer protruding portions 40, which are formed on the outer surfaces 35 of the first side portions 141. The outer protruding portions 40 of the housing 140 may extend from the lower ends of the first side portions 141 of the housing 140 toward the lower end of the base 210.

The outer protruding portions 40 of the housing 140 may be disposed so as to correspond to straight portions 170a (refer to FIG. 12) of the second coil 170 disposed on the base 210.

The outer protruding portions 40 of the housing 140 may overlap the straight portions 170a of the coil 170 in a direction perpendicular to the optical axis OA.

Figure 12:
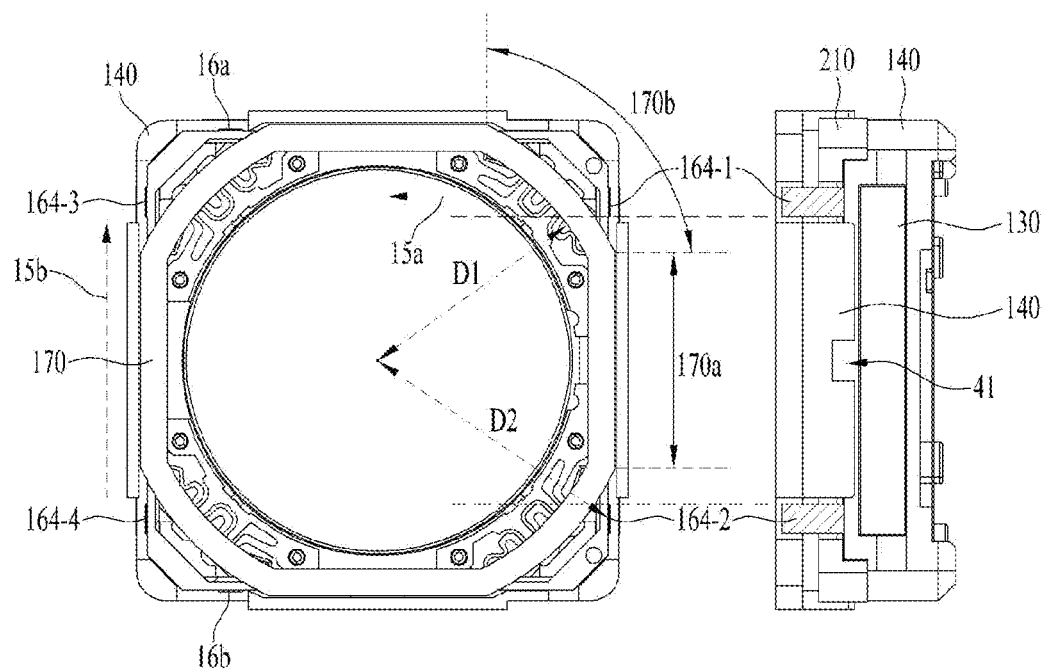
FIG. 12 is a plan view illustrating the arrangement relationship between the connection electrodes and the second coil.

For example, the outer protruding portions 40 of the housing 140 may face the straight portions 170a of the second coil 170, which is disposed on the base 210, in a first horizontal direction 15a (refer to FIG. 12).

The entire region of the straight portions 170a of the second coil 170 disposed on the base 210 may overlap the outer protruding portions 40 of the housing 140 in the first horizontal direction 15a (refer to FIG. 12).

For example, the length L1 of each of the outer protruding portions 40 of the housing 140 in a second horizontal direction may be longer than or equal to the length of each of the straight portions 170a of the second coil 170 in the second horizontal direction 15b (refer to FIG. 12).

The outer protruding portions 40 of the housing 140 may be located further outwards than the straight portions 170a of the second coil 170.

Further, the outer protruding portions 40 of the housing 140 may overlap the side plates 302a to 302d of the cover member 300 in the optical-axis direction.

Still further, the outer protruding portions 40 of the housing 140 may not overlap the magnet 130 in the optical-axis direction, without limitation thereto. For example, the outer protruding portions 40 of the housing 140 may at least partially overlap the magnet 130 in the optical-axis direction.

The lower ends 25 of the first side portions 141 of the housing 140 overlap the second coil 170 disposed on the base 210 in the optical-axis direction, but the outer protruding portions 40 of the housing 140 do not overlap the straight portions 170a of the second coil 170, which is disposed on the base 210, in the optical-axis direction.

An adhesive member or a sealing member 18a and 18b (refer to FIGS. 16a and 16b) may be disposed between the outer protruding portions 40 of the housing 140 and the side plates 302a to 302d of the cover member 300 in order to couple the housing 140 and the cover member 300 to each other and to inhibit introduction of external foreign substances.

The outer protruding portions 40 may protrude from the outer surfaces of the first side portions 141 of the housing 140 in the direction from the inner surfaces of the first side portions 141 toward the outer surfaces thereof, and may protrude from the lower ends of the first side portions 141 in the direction from the housing 140 toward the base 210.

The outer protruding portions 40 of the housing 140 protrude in the direction from the inner surfaces of the first side portions 141 of the housing 140 toward the outer surfaces 35 of the first side portions 141, and stepped portions are formed between the inner surfaces of the outer protruding portions 40 and the inner surfaces of the first side portions 141 of the housing 140. Thus, it is possible to secure a space in which the second coil 170 is disposed, to inhibit spatial interference between the cover member 300 and the second coil 170, and to protect the second coil 170.

In the process of winding the second coil 170 around the base 210, a portion of the second coil 170 may be exposed to the outside of a groove 201 in the base 210. In the case in which the outer protruding portions 40 are not provided, a portion of the second coil 170, which is exposed to the outside of the groove 201, may be damaged by the lower ends of the side plates 302a to 302d of the cover member 300, leading to an electrical disconnection of the second coil 170.

Further, if the housing 140 does not include the outer protruding portions 40 and if the lower end of the cover member extends to the lower end of the base 210, the gap between the cover member 300 and the housing 140 is increased, and thus the sealing member is not evenly spread in the space between the cover member 300 and the housing 140 and does not exhibit a secure sealing effect, which may incur introduction of external foreign substances into the cover member.

In the embodiment, since the outer protruding portions 40 are formed on the outer surfaces of the side portions of the housing 140, it is possible to inhibit the second coil 170 from being damaged by the cover member 300 and to inhibit an electrical short between the second coil 170 and the cover member 300.

In addition, in the embodiment, since the space between the outer protruding portions 40 and the cover member 300 is filled with the adhesive member or the sealing member 18a and 18b (refer to FIGS. 16a and 16b), it is possible to increase coupling force between the housing 140 and the cover member 300 and to inhibit introduction of foreign substances into the cover member.

A lower end portion 210a (refer to FIG. 8) of the base 210, which is located below the groove 201, may include protruding regions 211, which protrude from the inner surface of the base 210 further outwards than the outer surface of an upper end portion 210b (refer to FIG. 8) of the base 210, which is located above the groove 201. The outer protruding portions 40 of the housing 140 may overlap the protruding regions 211 of the lower end portion 210a of the base 210 in the optical-axis direction, and the lower ends of the outer protruding portions 40 may be disposed adjacent to the protruding regions 211 of the lower end portions 210a of the base 210.

The outer protruding portions 40 of the housing 140 may be provided therein with indented portions 41, into which the adhesive member or the sealing member 18a and 18b (refer to FIGS. 16a and 16b) is injected in order to couple the housing 140 and the cover member 300 to each other and to inhibit introduction of external foreign substances into the cover member 300.

The indented portions 41 may be located so as to contact the boundary surfaces between the outer protruding portions 40 and the outer surfaces of the first side portions of the housing 140. For example, each of the indented portions 41 may be disposed at the upper end or in the middle of the upper portion of a respective one of the outer protruding portions 40, and may include an opening 40a (refer to FIG. 15), which is open to the upper surface of a respective one of the outer protruding portions 40.

In addition, the outer protruding portions 40 of the housing 140 may be provided with inner protruding portions 42, which protrude from the inner surfaces of the outer protruding portions 40 in the direction from the outer surfaces of the outer protruding portions 40 toward the inner surfaces thereof so as to correspond to the indented portions 41.

For example, the inner protruding portions 42 may be formed so as to have the same size or shape as the indented portions 41, and the height that the inner protruding portions 42 protrude from the inner surfaces of the outer protruding portions 40 may be the same as the depth that the indented portions 41 are indented, without limitation thereto.

When the indented portions 41 are formed in the outer protruding portions 40 having a uniform thickness, the regions of the outer protruding portions 40, in which the indented portions 41 are formed, are reduced in thickness, which may lower the durability of the outer protruding portions 40. Therefore, in the embodiment, the inner protruding portions 42 are formed on the inner surfaces of the outer protruding portions 40 so as to correspond to the indented portions 41, thereby inhibiting deterioration in the durability of the outer protruding portions 40.

Figure 15:
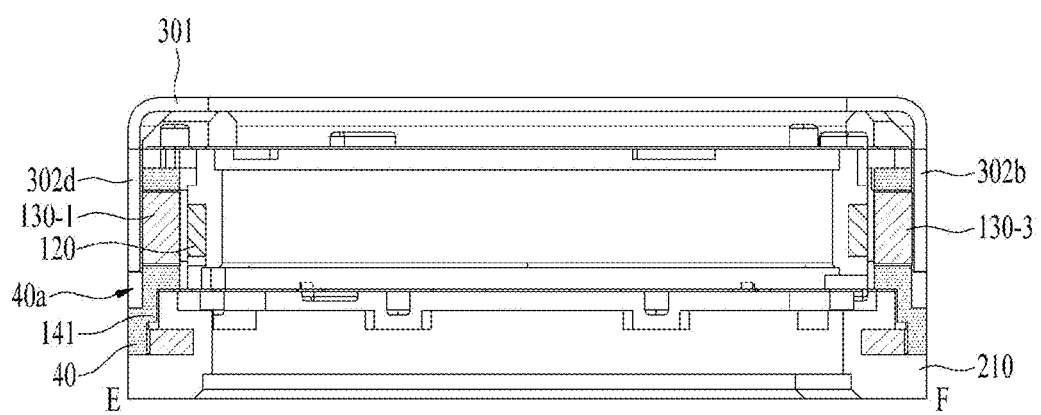
FIG. 15 illustrates a cross-sectional view of the lens moving apparatus taken in the direction EF in FIG. 1.
Figure 16A:
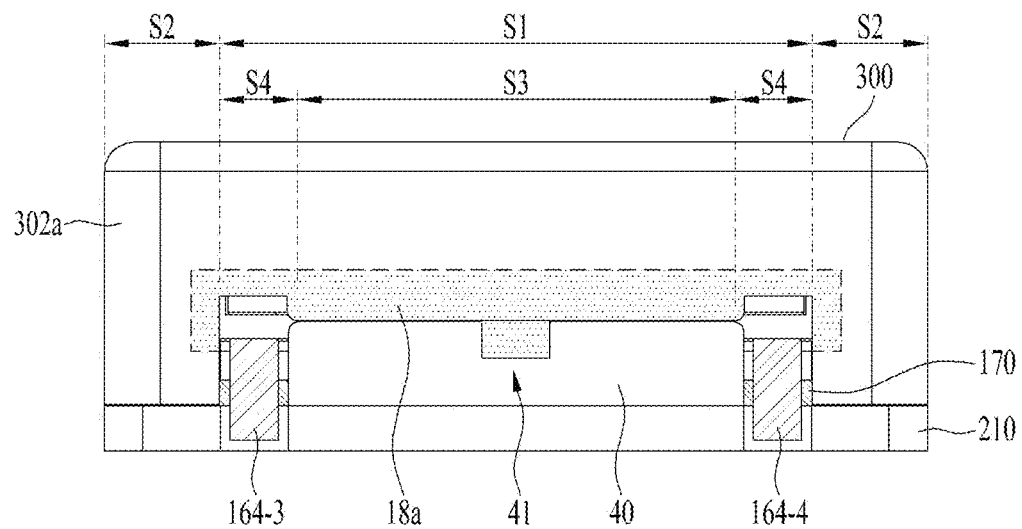
FIG. 16a illustrates a first side view of the lens moving apparatus shown in FIG. 1.
Figure 16B:
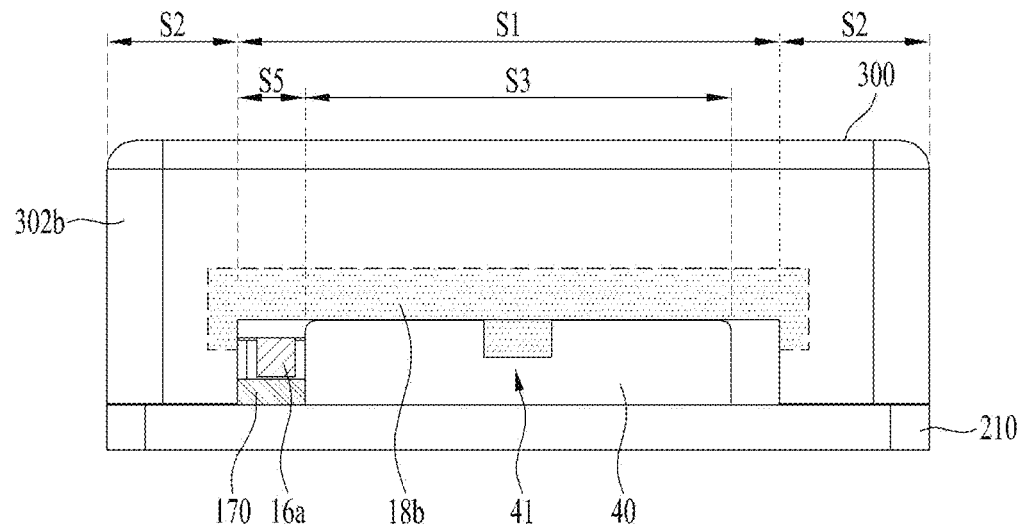
FIG. 16b illustrates a second side view of the lens moving apparatus shown in FIG. 1.

FIG. 15 illustrates a cross-sectional view of the lens moving apparatus 100 taken in the direction EF in FIG. 1, FIG. 16a illustrates a first side view of the lens moving apparatus 100 shown in FIG. 1, and FIG. 16b illustrates a second side view of the lens moving apparatus 100 shown in FIG. 1.

Referring to FIGS. 15, 16a and 16b, the side plates 302a to 302d of the cover member 300 may be configured to expose connection terminals 164-1 to 164-4, second bonding portions 16a and 16b and the outer protruding portions 40.

For example, each of the side plates 302a to 302d of the cover member 300 may include a first region S1, through which the connection terminals 164-1 to 164-4, the second bonding portions 16a and 16b and the outer protruding portions 40 are exposed, and a second region S2, which is the remaining region other than the first region S1.

In addition, the first region S1 may include a third region S3, through which the outer protruding portions 40 are exposed, a fourth region S4, through which the connection terminals 164-1 to 164-4 are exposed, and a fifth region S5, through which the second bonding portions 16a and 16b are exposed.

The lower end of the first region S1 of the cover member 300 may be located above the outer protruding portions 40, and the lower end of the second region S2 of the cover member 300 may extend to a region below the lower end of the first region S1. For example, the lower end of the second region S2 of the cover member 300 may extend to the lower end portion 210a of the base 210.

For example, the lower end of the fourth region S4 may be located above the lower end of the third region S3, and the lower end of the fifth region S5 and the lower end of the third region S3 may be located at the same height as each other.

In order to facilitate the coupling between the side plates 302a to 302d of the cover member 300 and the outer protruding portions 40 of the housing 140 and to increase coupling force therebetween, the lower end of the first region S1 of each of the side plates 302a to 302d of the cover member 300 may face the upper end of a respective one of the outer protruding portions 40 or may be aligned therewith in the optical-axis direction, and the lower end of the second region S2 of each of the side plates 302a to 302d of the cover member 300 may face the corner portion of the upper surface of the lower end portion 210a of the base 210 or may be aligned therewith in the optical-axis direction.

The lower ends of the outer protruding portions 40 and the corner portions of the upper surface of the lower end portion 210a of the base 210 may be in contact with each other, without limitation thereto. In another embodiment, the lower ends of the outer protruding portions 40 and the corner portions of the upper surface of the lower end portion 210a of the base 210 may be spaced apart from each other.

The lower end of the second region S2 of each of the side plates 302a to 302d of the cover member 300 and the upper surface of the lower end portion 210a of the base 210 may be spaced apart from each other, without limitation thereto. In another embodiment, the lower end of the second region S2 of each of the side plates 302a to 302d of the cover member 300 and the upper surface of the lower end portion 210a of the base 210 may be in contact with each other.

For example, the outer surface of the lower end portion 210a of the base 210, the outer surface of each of the outer protruding portions 40 of the housing 140 and the third region S3 of each of the side plates of the cover member 300 may be located on the same plane as one another, with limitation thereto.

A space may be present between the opening 40a of the indented portion 41 formed in each of the outer protruding portions 40 of the housing 140 and the lower end of the first region S1 of each of the side plates 302a to 302d of the cover member 300. An adhesive member or a sealing member may be injected through the openings 40a of the indented portions 41. The adhesive member or the sealing member 18a and 18b, as illustrated in FIGS. 16a and 16b, may be disposed between the inner surface of the cover member 300, which is adjacent to the lower end of the first region S1 of each of the side plates 302a to 302d of the cover member 300, and a corresponding region of the outer surface of each of the first side portions of the housing 140.

Next, the magnet 130 will be described.

At the initial position of the AF driving unit, e.g. the initial position of the bobbin 110, the magnet 130 may be disposed at the side portion of the housing 140 so as to correspond to or to be aligned with the first coil 120. Here, the initial position of the bobbin 110 may be the initial position of the AF driving unit when power is not applied to the first coil 120, or may be a position at which the AF driving unit is located when the upper and lower elastic members 150 and 160 are elastically deformed only by the weight of the AF driving unit.

Alternatively, the initial position of the bobbin 110 may be a position at which the AF driving unit is located when gravity acts in the direction from the bobbin 110 toward the base 210 or in the direction from the base 210 toward the bobbin 110.

The AF driving unit may include the bobbin 110 and components installed to the bobbin 110.

For example, the magnet 130 may be disposed in the groove 141a in the housing 140 so as to overlap the first coil 120 in the second direction or in the third direction.

In another embodiment, the groove 141a may not be formed in the first side portions 141 of the housing 140, and the magnet 130 may be disposed on any one of the outer surface and the inner surface of each of the first side portions 141 of the housing 140.

The magnet 130 may have a shape corresponding to the shape of each of the first side portions 141 of the housing 140, for example, may have a rectangular parallelepiped shape, without limitation thereto.

The magnet 130 may be a monopolar-magnetized magnet or a bipolar-magnetized magnet, which is disposed such that the surface thereof that faces the first coil 120 is an S pole and the opposite surface thereof is an N pole. However, the disclosure is not limited thereto, and the poles of the magnet may be reversed.

In the embodiment, four magnets 130 are provided. However, the disclosure is not limited thereto, and at least two magnets 130 may be provided. The surface of each of the magnets 130 that faces the first coil 120 may be formed in the shape of a planar surface, without limitation thereto. The surface of each of the magnets 130 that faces the first coil 120 may be formed in the shape of a curved surface.

Next, the upper elastic member 150 and the lower elastic member 160 will be described.

Figure 7:
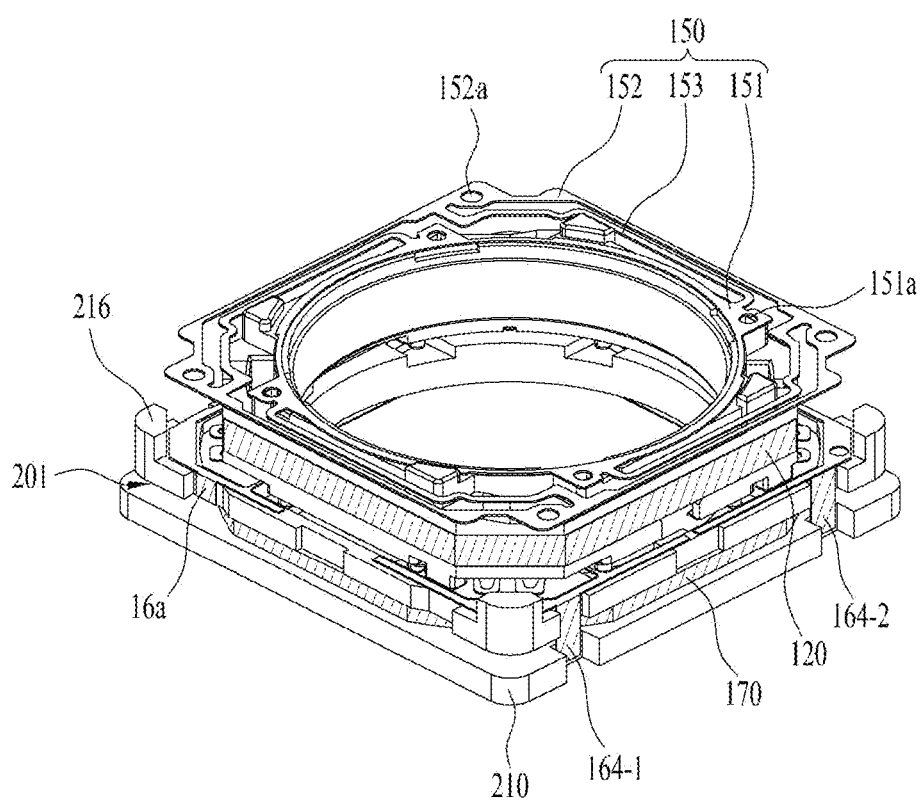
FIG. 7 illustrates a coupled view of the bobbin, the first coil, an upper elastic member, a lower elastic member, a base and a second coil.
Figure 8:
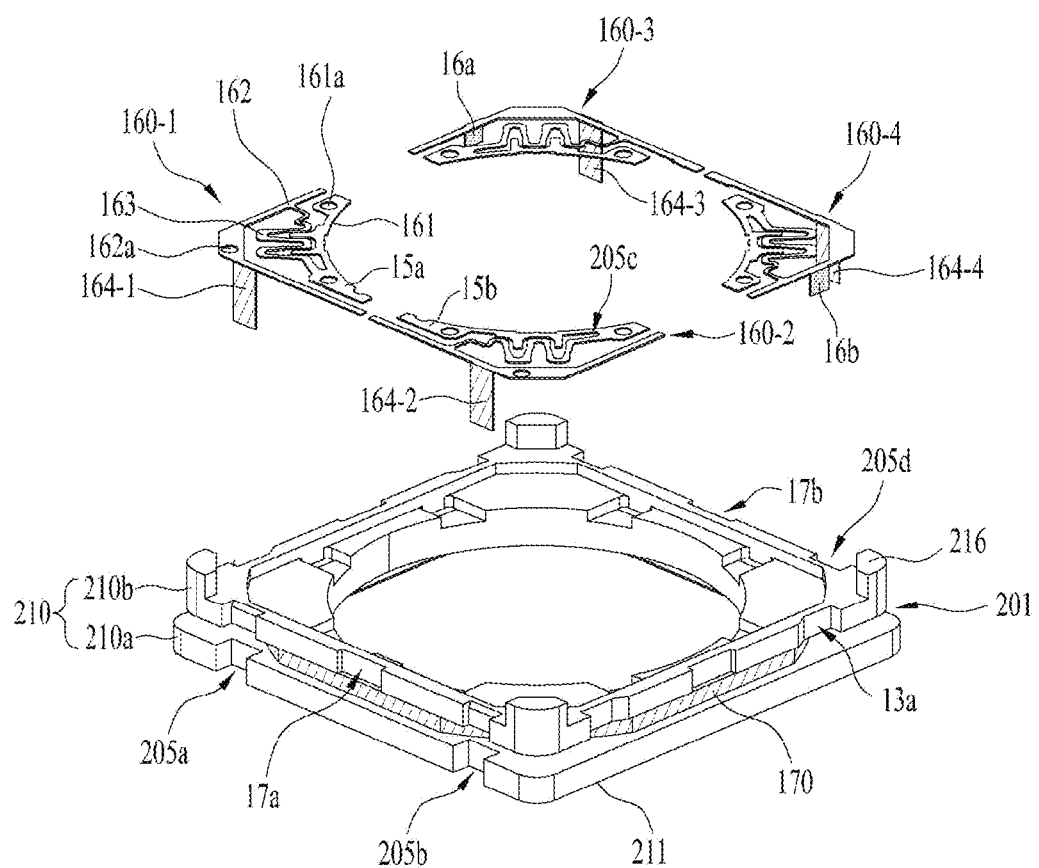
FIG. 8 illustrates an exploded perspective view of the base, to which the second coil is coupled, and the lower elastic member.
Figure 9:
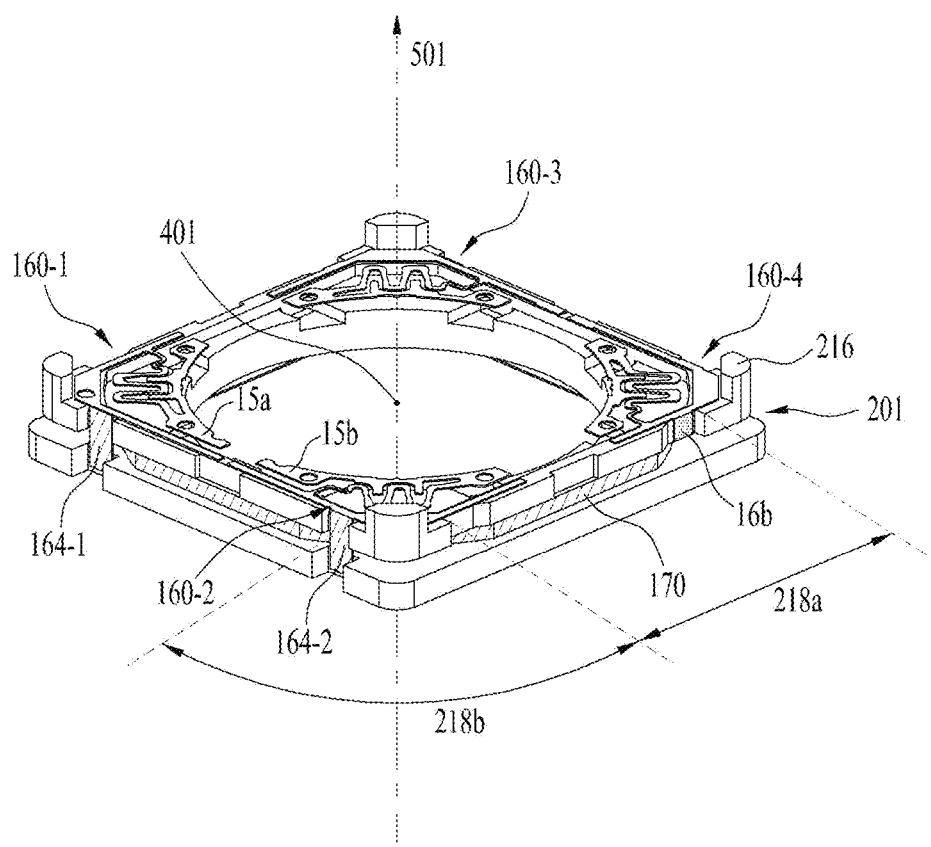
FIG. 9 illustrates a coupled perspective view of the second coil, the base and the lower elastic member shown in FIG. 8.
Figure 10:
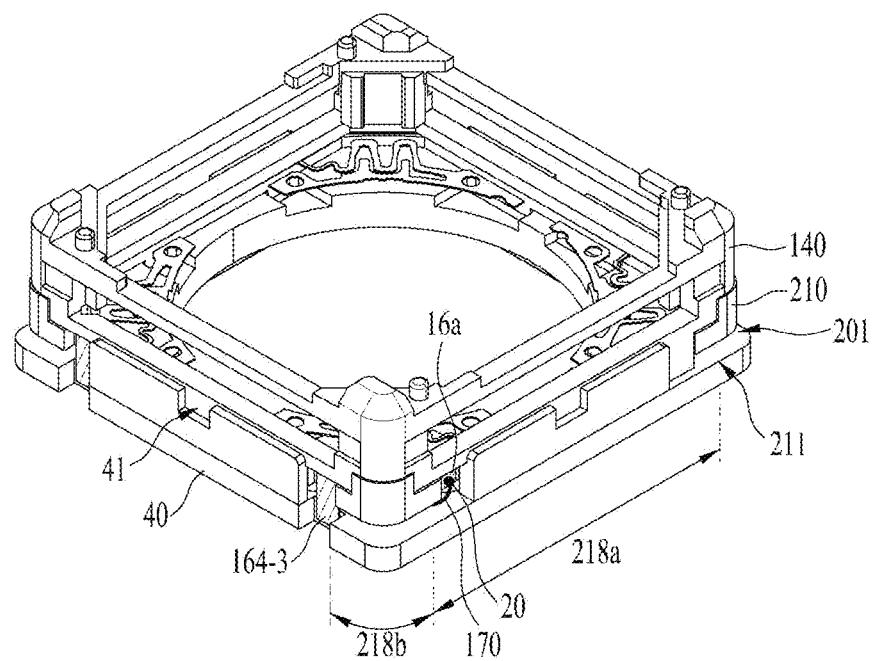
FIG. 10 illustrates the arrangement of a second bonding portion and a connection terminal, which are disposed at the base.
Figure 11:
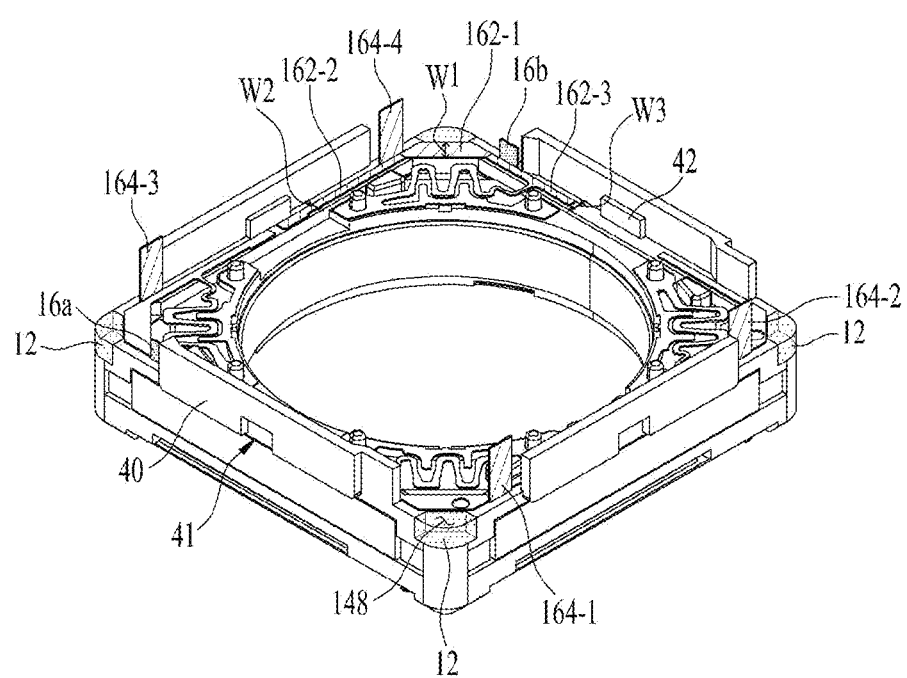
FIG. 11 illustrates a bottom perspective view of the lens moving apparatus shown in FIG. 2 from which the illustration of the base and the magnet is omitted.
Figure 14:
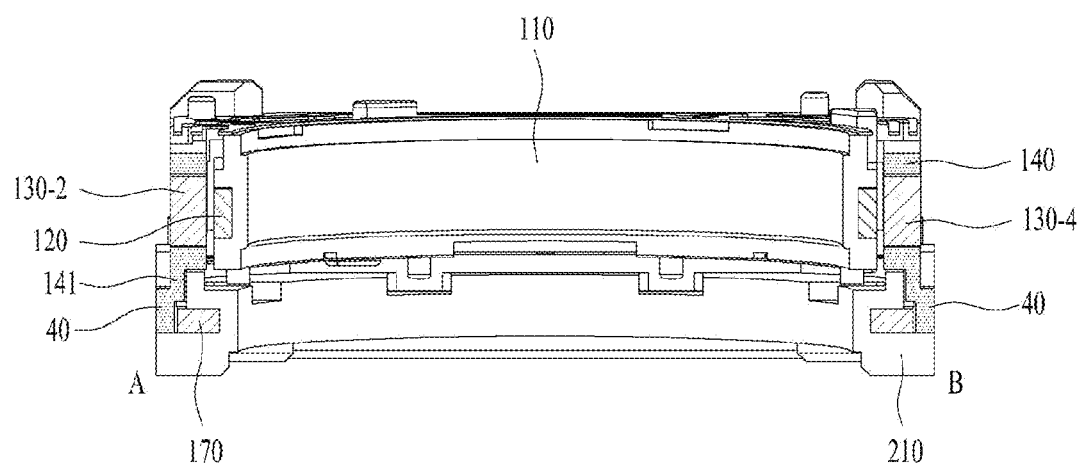
FIG. 14 illustrates a cross-sectional view of the lens moving apparatus taken in the direction AB in FIG. 2.

FIG. 7 illustrates a coupled view of the bobbin 110, the first coil 120, the upper elastic member 150, the lower elastic member 160, the base 210 and the second coil 170, FIG. 8 illustrates an exploded perspective view of the base 210, to which the second coil 170 is coupled, and the lower elastic member 160, FIG. 9 illustrates a coupled perspective view of the second coil 170, the base 210 and the lower elastic member 160 shown in FIG. 8, FIG. 10 illustrates the arrangement of the second bonding portion 16a and the connection terminal 164-3, which are disposed at the base 210, FIG. 11 illustrates a bottom perspective view of the lens moving apparatus shown in FIG. 2 from which the illustration of the base 210 and the magnets 130-1 to 130-4 is omitted, and FIG. 14 illustrates a cross-sectional view of the lens moving apparatus taken in the direction AB in FIG. 2.

Referring to FIGS. 7 to 11 and 14, the upper elastic member 150 and the lower elastic member 160 are coupled to the bobbin 110 and the housing 140 and elastically support the bobbin 110.

For example, the upper elastic member 150 may be coupled to the upper portion (the upper surface or the upper end) of the bobbin 110 and to the upper portion (the upper surface or the upper end) of the housing 140.

The lower elastic member 160 may be coupled to the lower portion (the lower surface or the lower end) of the bobbin 110 and to the lower portion (the lower surface or the lower end) of the housing 140.

The upper elastic member 150 shown in FIG. 7 is not divided into a plurality of elastic members. However, the disclosure is not limited thereto. In another embodiment, the upper elastic member 150 may include a plurality of elastic members, which are spaced apart from each other.

The upper elastic member 150 may include a first inner frame 151, which is coupled to the upper portion of the bobbin 110, a first outer frame 152, which is coupled to the upper portion of the housing 140, and a first connection portion 153, which connects the first inner frame 151 and the second outer frame 152 to each other.

The upper elastic member 150 may be provided in the first inner frame 151 thereof with a through-hole 151*a*, into which an upper support protrusion 113 of the bobbin 110 is coupled, and may be provided in the first outer frame 152 thereof with a through-hole 152*a*, into which an upper frame support protrusion 144 of the housing 140 is coupled.

The lower elastic member 160 may include elastic members, which are divided or separated into two or more segments. For example, the elastic members may be referred to as springs or lower springs.

For example, the lower elastic member 160 may include first to fourth elastic members 160-1 to 160-4, which are spaced apart from each other, and the first to fourth elastic members 160-1 to 160-4 may be electrically disconnected from each other.

For example, the first coil 120 may be electrically connected to any two of the elastic members 160-1 to 160-2 of the lower elastic member 160, and the second coil 170 may be electrically connected to the remaining two of the elastic members 160-1 to 160-2.

Each of the first to fourth elastic members 160-1 to 160-4 may include a second inner frame 161, which is coupled to the lower portion of the bobbin 110, a second outer frame 162, which is coupled to the lower portion of the housing 140, and a second connection portion 163, which connects the second inner frame 161 and the second outer frame 162 to each other.

The lower elastic member 160 may be provided in the second inner frame 161 thereof with a through-hole 161*a*, into which a lower support protrusion 117 of the bobbin 110 is coupled, and may be provided in the second outer frame 162 thereof with a through-hole 162*a*, into which a lower frame support protrusion of the housing 140 is coupled.

For example, the first coil 120 may be bonded to the inner frames of any two of the elastic members 160-1 to 160-4.

For example, the second coil 170 may be bonded to the outer frames of the remaining two of the elastic members 160-1 to 160-4.

Each of the upper elastic member 150 and the lower elastic member 160 may be embodied as a leaf spring, without limitation thereto. Each of the upper elastic member 150 and the lower elastic member 160 may be embodied as a coil spring, a suspension wire, or the like.

Each of the first and second connection portions 153 and 163 may be bent or curved at least once so as to form a predetermined pattern. The upward and/or downward movement of the bobbin 110 in the first direction may be flexibly (or elastically) supported by positional change or fine deformation of the first and second connection portions 153 and 163.

In order to inhibit oscillation while the bobbin 1110 moves, a damper may be disposed between the first connection portion 153 of the upper elastic member 150 and the upper surface of the bobbin 110. Alternatively, a damper (not illustrated) may also be disposed between the second connection portion 163 of the lower elastic member 160 and the lower surface of the bobbin 110.

Alternatively, a damper may be applied to the coupling portion between the upper elastic member 150 and each of the bobbin 110 and the housing 140 or to the coupling portion between the lower elastic member 160 and each of the bobbin 110 and the housing 140. For example, the damper may be gel-type silicon.

For example, the first to fourth elastic members 160-1 to 160-4 may be disposed so as to be separated or spaced apart from each other on the first side portions 141 of the housing 140.

The first and second elastic members 160-1 and 160-2 may be provided at one ends of the second inner frames 161 thereof with first bonding portions 15*a* and 15*b*, to which opposite ends of the first coil 120 are bonded.

The reason why the first bonding portions 15*a* and 15*b* are provided at the second inner frames is that the second inner frames 161 are located closer to the bobbin 110 than the second outer frames 163, whereby bonding to the first coil 120 is further facilitated. For example, each of the first bonding portions 15*a* and 15*b* may be provided with a groove for guiding the first coil 120.

The third and fourth elastic members 160-3 and 160-4 may be provided at the second outer frames 163 thereof with second bonding portions 16*a* and 16*b*, to which opposite ends of the second coil 170 are bonded.

The reason why the second bonding portions 16*a* and 16*b* are provided at the second outer frames 163 is that the second outer frames 163 are located closer to the outer surface of the base 210 than the second inner frames 161, whereby bonding to the second coil 170 is further facilitated.

One end of the second coil 170 may be bonded to the second bonding portion 16*a* of the third elastic member 160-3 and the opposite end of the second coil 170 may be bonded to the second bonding portion 16*b* of the fourth elastic member 160-4 by an adhesive member such as solder 20 (refer to FIG. 10).

The first coil 120 is connected to the first bonding portions 15*a* and 15*b*, which are provided at the second inner frame 161 of the lower elastic member 160, and the second coil 170 is connected to the second bonding portions 16*a* and 16*b*, which are provided at the second outer frame 163 of the lower elastic member 160, thereby reducing the distance between the two points for bonding and consequently further facilitating bonding.

The first bonding portions 15*a* and 15*b* of the lower elastic members 160 may be provided at one ends of the second inner frames of the elastic members (e.g. 160-1 and 160-2), which face each other in the second direction or in the third direction). However, the disclosure is not limited thereto.

The second bonding portions 16*a* and 16*b* may be connected to the outer surfaces of the second outer frames 163 of the third and fourth elastic members 160-3 and 160-4, and may be bent and extend in the direction from the second outer frame 163 toward the base 210.

For example, the second bonding portion 16*a* may be bent in the direction from the second outer frame 163 of the third elastic member 160-3 toward the base 210, and the second bonding portion 16*b* may be bent in the direction from the second outer frame 163 of the fourth elastic member 160-4 toward the base 210.

The reason why the second bonding portions 16*a* and 16*b* are bent and extend in the direction from the second outer frame 163 toward the base 210 is to reduce the spacing distance from the second coil 170 disposed on the outer surface of the base 210, thereby facilitating bonding between the second bonding portions 16a and 16b and the second coil 170.

In the first and second bonding portions 15a, 15b, 16a and 16b described above, the term "bonding portion" may be referred to as a pad portion, a connection terminal portion, a solder portion, or an electrode portion.

The first to fourth elastic members 160-1 to 160-4 may include connection terminals 164-1 to 164-4, respectively, each of which is connected to the outer surface of the second outer frame 162 and is bent and extends in the direction from the second outer frame 163 toward the base 210.

Each of the connection terminals 164-1 to 164-4 of the first to fourth elastic members 160-1 to 160-4 may be bent in the direction from the second outer frame 162 toward the base 210. The connection terminals 164-1 to 164-4 may be disposed so as to be spaced apart from each other.

Each of the connection terminals 164-1 to 164-4 of the first to fourth elastic members 160-1 to 160-4 may be disposed, seated or inserted into a corresponding one of first indented portions 205a to 205d formed in the base 210.

For example, the first connection terminals 164-1 and 164-2 of the first and second elastic members 160-1 and 160-2 may be disposed at a first outer surface of the base 210 so as to be in contact with the first outer surface.

The second connection terminals 164-3 and 164-4 of the third and fourth elastic members 160-3 and 160-4 may be disposed at a second outer surface of the base 210 so as to be in contact with the second outer surface. For example, the first outer surface and the second outer surface of the base 210 may face each other or may be disposed opposite each other.

In addition, the second bonding portion 16a of the third elastic member 160-3 may be disposed at a third outer surface of the base 210 so as to be in contact with the third outer surface. The second bonding portion 16b of the fourth elastic member 160-4 may be disposed at a fourth outer surface of the base 210. The third outer surface and the fourth outer surface of the base 210 may face each other or may be disposed opposite each other.

The connection terminals 164-1 to 164-4 of the first to fourth elastic members 160-1 to 160-4 may be exposed from the base 210, and the connection terminals 164-1 to 164-4 may be electrically disconnected from each other.

For example, the inner surface of each of the connection terminals 164-1 to 164-4 disposed in the first indented portions 205a to 205d may be in contact with one surface (e.g. the lower surface) of a corresponding one of the first indented portions 205a to 205d.

The outer surface of each of the connection terminals 164-1 to 164-4 disposed in the first indented portions 205a to 205d may be exposed from the outer surface of the base 210, and the lower end of each of the connection terminals 164-1 to 164-4 may be exposed from the lower surface of the base 210.

The lower ends of the second bonding portions 16a and 16b may be disposed above the groove 201 in the base 210, and the lower end of each of the connection terminals 164-1 to 164-4 may extend to a region below the groove 201 in the base 210. For example, on the basis of the outer frame 151 of the upper elastic member 150, the length of each of the connection terminals 164-1 to 164-4 in the optical-axis direction may be greater than the length of each of the second bonding portions 16a and 16b in the optical-axis direction.

The depth of each of the first indented portions 205a to 205d may be greater than the thickness of each of the connection terminals 164-1 to 164-4, and the outer surface of each of the connection terminals 164-1 to 164-4 disposed in the first indented portions 205a to 205d may not protrude to the outside of the first indented portions 205a to 205d.

In order to receive power or signals from the outside, the connection terminals 164-1 to 164-4 may be electrically connected to external wires or to external elements using a conductive member, e.g. using soldering or the like.

In the case in which solders bonded to the connection terminals 164-1 to 164-4 protrude to the outside of the outer surface of the base 210, the solders bonded to the connection terminals 164-1 to 164-4 and the cover 300 may contact or collide each other, leading to an electrical short or disconnection. In the embodiment, the first indented portions 205a to 205d are formed with a sufficient depth to inhibit the solders bonded to the connection terminals 164-1 to 164-4 from protruding to the outside of the outer surface of the base 210, thereby inhibiting the above-mentioned electrical short or disconnection.

In the case in which the first and second coils 120 and 170 are directly bonded to the connection terminals 164-1 to 164-4 using first solders, when soldering is performed on the connection terminals 164-1 to 164-4 for electric connection to the outside, the first solders may melt, and thus the first and second coils 120 and 170 may be electrically disconnected.

In the embodiment, since the first and second bonding portions 15a, 15b, 16a and 16d, to which the first and second coils are bonded, and the connection terminals 164-1 to 164-4, which are electrically connected to the outside, are additionally provided at the lower elastic member 160, it is possible to inhibit electrical disconnection of the first and second coils 120 and 170 when soldering is performed on the connection terminals.

In the connection terminals 164-1 to 164-4 described above, the term "connection terminal" may be referred to as a pad portion, a bonding portion, a solder portion, or an electrode portion.

A driving signal for driving the first coil 120 may be supplied to the first and second connection terminals 164-1 and 164-2 of the first and second elastic members 160-1 and 160-2, at which the first bonding portions 15a and 15b are provided, and the inductive voltage of the second coil 170 may be output to the outside via the third and fourth connection terminals 164-3 and 164-4 of the third and fourth elastic members 160-3 and 160-4, at which the second bonding portions 16a and 16b are provided.

The base 210 may be coupled to the housing 140, and may form an accommodating space together with the cover member 300 to accommodate the bobbin 110 and the housing 140. The base 210 may have therein a hollow region corresponding to the hollow region in the bobbin 110 and/or the hollow region in the housing 140, and may have a shape that matches or corresponds to the shape of the cover member 300, for example, a rectangular shape.

The base 210 may include a guide member 216 (refer to FIG. 8), which protrudes a predetermined height in an upward direction from each of the four corner portions thereof. The guide member 216 may be formed in the shape of a polyprism that protrudes from the upper surface of the base 210 so as to be perpendicular to the upper surface of the base 210. However, the disclosure is not limited thereto.

The guide member 216 may be inserted, fastened or coupled to the lower guide recess 148 in the housing 140 using the adhesive member 12 (refer to FIG. 11) such as epoxy or silicon.

The second coil 170 may be disposed below the lower elastic member 160 and may be disposed so as to be wound around the outer surface of the base 210 in a clockwise or counterclockwise direction about the optical axis.

For example, the first coil 120 may have a closed loop shape, e.g. a ring shape.

For example, the base 210 may be provided in the outer surface thereof with a groove 201.

For example, the groove 201 in the base 210 may have a structure that is indented from the outer surface of the base 210. The groove 201 may be spaced apart from the upper surface and the lower surface of the base 210. The reason for this is to inhibit the second coil 170, which is disposed in or wound around the groove 201 in the base 201, from being separated from the base 210.

The length of the second coil 170 in the optical-axis direction, which is wound around the groove 201 in the base 210, may be less than the length thereof in a direction that is oriented from the inner circumferential surface of the base 210 toward the outer circumferential surface of the base 210 and that is perpendicular to the optical axis. Thereby, it is possible to reduce the height or length of the lens moving apparatus 100 in the optical-axis direction.

The base 210 may include first side portions 218a corresponding to or aligned with the first side portions 141 of the housing 140 and second side portions 218b corresponding to or aligned with the second side portions 142 of the housing 140. The first side portions 218a of the base 210 may have flat outer surfaces, and the second side portions 218b of the base 210 may have curved outer surfaces.

Each of the second side portions 218b of the base 210 may connect two adjacent second side portions to each other, and may be located at the corner of the base. For example, the second side portions 218b may be referred to as corner portions.

The groove 201 in the base 210 may have a structure that is indented from the outer surfaces of the first side portions 218a and the second side portions 218b and may have a ring shape.

At least one of the first side portions 218a of the base 210 may be provided in the outer surface thereof with the first indented portions 205a to 205d, which correspond to the first to fourth connection terminals 164-1 to 164-4 of the first to fourth elastic members 160-1 to 160-4.

In addition, at least another one of the first side portions 218a of the base 210 may be provided in the outer surface thereof with second indented portions 13a, in which the second bonding portions 16a and 16b are disposed.

For example, the first indented portions 205a to 205d may be formed in the outer surfaces of the first side portions of the base 210, which face each other, so as to be spaced apart from each other, and the second indented portions 13a may be formed in the outer surfaces of the first side portions of the base 210, in which the first indented portions 205a to 205d are not formed. However, the disclosure is not limited thereto.

For example, the first indented portions 205a to 205d may be formed in the outer surfaces of two first side portions of the base 210, which do not face each other, depending on the arrangement of the first to fourth connection terminals 164-1 to 164-4.

For example, each of the first indented portions 205a to 205d and the second indented portions 13a may include an upper opening, which is open to the upper surface of the base 210, and a lower opening, which is open to the lower surface of the base 210.

The distance that the first indented portions 205a to 205d are indented in the outer surface of the base 210 and the distance that the second indented portions 13a are indented in the outer surface of the base 210 may be less than the distance that the groove 201 is recessed in the side surface of the base 210. For example, the depth that the first indented portions 205a to 205d are indented in the outer surface of the base 210 and the depth that the second indented portions 13a are indented in the outer surface of the base 210 may be less than the depth that the groove 201 is recessed.

Thereby, the first to fourth connection terminals 164-1 to 164-4 of the lower elastic member 160, which are disposed in the first indented portions 205a to 205d in the base 210, may be spaced apart from the second coil 170, which is disposed in the groove 201 in the base 210. Accordingly, it is possible to inhibit spatial interference between the first to fourth connection terminals 164-1 to 164-4 and the second coil 170.

The second coil 170 and the connection electrodes 164-1 to 164-4 are disposed at the outer surfaces of the side portions 218a and 218b of the base 210, and the connection electrodes 164-1 to 164-4 extend to a region below the groove 201 in which the second coil 170 is disposed. Thus, in the case in which the second coil 170 and the connection electrodes 164-1 to 164-4 are disposed so as to overlap each other in the optical-axis direction and in a direction perpendicular to the optical axis, there may occur spatial interference therebetween.

In this case, if the groove 201, in which the second coil 170 is disposed, is formed to be deeper, spatial interference between the second coil 170 and the connection electrodes 164-1 to 164-4 may be avoided. However, it is not easy to form the base 210 having a deeper groove 201 through injection molding, and the length of the second coil 170, which is wound around the groove 201 having a greater depth, is decreased, whereby a predetermined resistance value of the second coil 170 cannot be secured.

The inductive voltage of the second coil 170 may be changed depending on a change in ambient temperature, and the change in the inductive voltage may cause erroneous operation of the AF driving unit. In order to secure the accurate operation of the AF driving unit, temperature compensation is required. In order to facilitate the temperature compensation, the resistance value of the second coil 170 needs to be greater than or equal to a preset resistance value (e.g. 30Ω).

Figure 13:
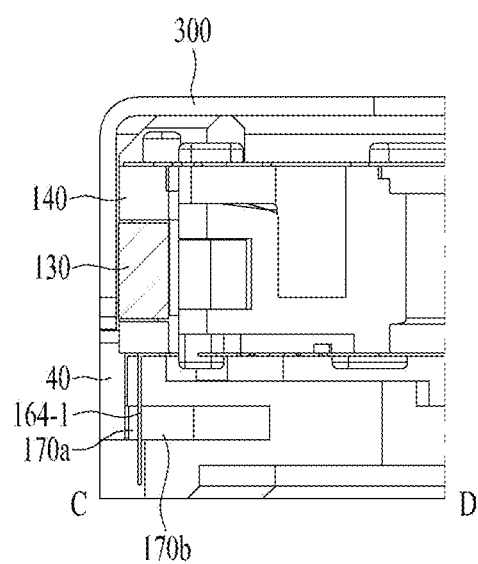
FIG. 13 illustrates a cross-sectional view of the lens moving apparatus taken in the direction CD in FIG. 1.

FIG. 12 is a plan view illustrating the arrangement relationship between the connection electrodes 164-1 to 164-4 and the second coil 170, and FIG. 13 illustrates a cross-sectional view of the lens moving apparatus 100 taken in the direction CD in FIG. 1.

Referring to FIGS. 12 and 13, the second coil 170, which is disposed at the outer surface of the base 210, may take the form of a ring having a straight portion and a curved portion. In the second coil 170, a portion having a straight line shape is referred to as a "straight portion", and a portion having a curved line shape is referred to as a "curved portion".

For example, a first portion 170a of the second coil 170, which is disposed in the groove 210 formed in the first side portion 218a of the base 210, may have a straight line shape, and a second portion 170b of the second coil 171, which is disposed in the groove 210 formed in the second side portion 218a of the base 210, may have a curved line shape. For example, the first portion 170a of the second coil 170 may be a straight portion, and the second portion 170b thereof may be a curved portion.

For example, the depth of the groove 201 formed in the first side portion 218a of the base 210 may be uniform and may be less than the depth of the groove 210 formed in the second side portion 218a.

The straight portion of the second coil 170 may be located between two connection terminals 164-1 and 164-2 or 164-3 and 164-4, which are disposed at the outer surface of any one of the first side portions 218a of the base 210.

Each of the first to fourth connection terminals 164-1 to 164-4 may be disposed so as to overlap the second portion 170b of the second coil 170 in a first horizontal direction 15a.

For example, the first horizontal direction 15a may be a direction that is perpendicular to the outer surface of the first side portion 218a of the base 210, at which the connection terminals 164-1 to 164-4 are disposed.

Further, the connection terminals 164-1 and 164-2 or 164-3 and 164-4, which are disposed at the outer surface of any one of the first side portions 218a of the base 210 may be disposed so as to overlap the first portion 170a of the second coil 170, which is disposed at the any one of the first side portions 218a of the base 210 in a second horizontal direction 15b.

For example, the second horizontal direction 15b may be a direction that is perpendicular to the optical axis OA and that is parallel to the outer surface of the any one of the first side portions 218a of the base 210.

For example, the first portion 170a of the second coil 210 disposed at the base 210 may be disposed between two connection terminals 164-1 and 164-2 or 164-3 and 164-4, which are disposed at the outer surface of the any one of the first side portions 218a of the base 210.

The connection terminals 164-1 and 164-2 or 164-3 and 164-4, which are disposed at the outer surface of any one of the first side portions 218a of the base 210, are disposed so as to overlap the second portion 170b of the second coil 170 in the first horizontal direction 15a. Thus, although the connection terminals 164-1 and 164-2 or 164-3 and 164-4, which are disposed at the outer surface of any one of the first side portions 218a of the base 210, and the first portion 170a of the second coil 170 overlap each other in the second horizontal direction 15b, the connection terminals 164-1 and 164-2 or 164-3 and 164-4 and the second coil 170 may be disposed without spatial interference therebetween.

Therefore, in the embodiment, the depth of the groove 201, which is formed in the outer surface of the base 210 in order to avoid special interference between the connection terminals and the second coil, may be reduced, the resistance value of the second coil 170 disposed in the groove 210 may be increased, and productibility of a mold for forming the base 210 and injection moldability thereof may be easily secured.

In addition, the second bonding portions 16a and 16b of the third and fourth elastic members 160-3 and 160-4 may overlap the second portion 170b of the second coil 170 in the first horizontal direction 15a, and may overlap the first portion 170a of the second coil 160 in the second horizontal direction. However, the disclosure is not limited thereto.

Referring to FIGS. 9 and 12, a first spacing distance D1 may be less than a second spacing distance D2 (D1<D2).

The first spacing distance D1 may be a distance between a reference line 501, which passes through a center 401 of the base 210 and is parallel to the optical axis OA, and the second coil 170, which is disposed in the groove 201 in the base 210. For example, the first spacing distance D1 may be a distance between the center 401 of the base 210 and the second portion 170b of the second coil 170.

The second spacing distance D2 may be a distance between the reference line 501 and the connection terminals 164-1 to 164-4, which are disposed in the first indented portions 205a to 205d.

The connection terminals 164-1 to 164-4 of the lower elastic member 160, which are disposed in the first indented portions 205a to 205d, and the second coil 170, which is disposed in the groove 201, may be spaced apart from each other in order to inhibit electrical contact therebetween.

A portion of the lower end of the side plate of the cover member 300 and the protruding region 211 of the lower end portion 210a of the base 210 may face each other so as to correspond to each other in the optical-axis direction. For example, a portion of the lower end of the side plate of the cover member 300 may overlap the protruding region 211 of the lower end portion 210a of the base 210 in the optical-axis (OA) direction. At this time, the protruding region 211 of the lower end portion 210a of the base 210 and the lower end of the side plate of the cover member 300 may be spaced apart from each other, with limitation thereto.

Referring to FIGS. 8 and 10, each of the third and fourth elastic members 160-3 and 160-4 may include a second bonding portion 16a and 16b and a connection terminal 164-3 and 164-4.

The second bonding portion 16a and 16b and the connection terminal 164-3 and 164-4 of each of the third and fourth elastic members 160-3 and 160-4 may be disposed at different outer surfaces of the base 210.

For example, each of the second bonding portion 16a and the connection terminal 164-3 of the third elastic member 160-3 may be disposed at a corresponding one of the outer surfaces of two first side portions, which are adjacent to any one of the second side portions (or the corner portions) of the base 210.

In addition, for example, each of the second bonding portion 16a and the connection terminal 164-3 of the fourth elastic member 160-4 may be disposed at a corresponding one of the outer surfaces of two first side portions, which are adjacent to another one of the second side portions of the base 210.

The reason why the second bonding portion 16a and 16b and the connection terminal 164-3 and 164-4 are disposed at the outer surfaces of different first side portions of the base 210 is to inhibit heat generated while the soldering process for electrical connection is performed on the connection terminal 164-3 and 164-4 from being transferred to the solder bonded to the second bonding portion 16a and 16b, thereby inhibiting the second bonding portion 16a and 16b and the second coil 170 from being electrically disconnected from each other.

In order to realize electrical connection to the outside, the connection terminals 164-1 to 164-4 may extend from the second outer frames 162 of the elastic members 160-1 to 160-4 to the second coil 170 or to a region below the groove 201 in the base 210.

Meanwhile, in order to facilitate the electrical connection of the second coil 170, the second bonding portions 16a and 16b may be disposed at predetermined regions of the outer side portions of the base 210, which are located above the groove 201 in the base 210.

Referring to FIG. 11, in each of the third and fourth elastic members 160-3 and 160-4, the first width W1 of the first region 162-1 of the second outer frame 162 may be greater than the second width W2 of the second region 162-2 of the second outer frame 162 and the third width W3 of the third region 162-3 (W1>W2 and W1>W3).

The second region 162-2 may be a region to which the connection terminal 162-2 is connected, the third region 162-3 may be a region to which the second bonding portion 16b is connected, and the first region 162-1 may be a region that connects the second region 162-2 and the third region 162-3 to each other.

It is possible to increase an area for dissipating heat generated while the soldering process is performed on the connection terminal 164-4 by increasing the area of the first region 162-1. Accordingly, it is possible to inhibit heat generated while the soldering process is performed on the connection terminal 164-4 from being transferred to the second bonding portion 16b and to inhibit electrical disconnection between the second bonding portion 16b and the second coil 170.

Further, in order to support the housing 140 and the bobbin 110 in equilibrium, the inner frame, the outer frame and the connection portion of any one of the first to fourth elastic members 160-1 to 160-4 may have the same shape as the inner frames, the outer frames and the connection portions of the remaining ones of the first to fourth elastic members 160-1 to 160-4. The first to fourth elastic members 160-1 to 160-4 may be arranged symmetrical to each other about the optical axis.

In order to achieve balanced support, for example, in each of the first and second elastic members 160-1 and 160-2, the fourth width of the fourth region of the second outer frame 162 may be greater than the fifth width of the fifth region of the second outer frame 162 and the sixth width of the sixth region.

The fourth region of each of the first and second elastic members 160-1 and 160-2 may be a region corresponding to the first region 162-1 of each of the third and fourth elastic members, the fifth region of each of the first and second elastic members may be a region corresponding to the second region 162-2 of each of the third and fourth elastic members, and the sixth region of each of the first and second elastic members may be a region corresponding to the third region 162-3 of each of the third and fourth elastic members.

Referring to FIG. 8, the base 210 may be provided in the outer surface of each of the first side portions 218a thereof with a third indented portion 17a, which corresponds to the inner protruding portion 42 of the housing 140.

For example, the third indented portion 17a, which is formed in the outer surface of each of the first side portions 218a of the base 210, may be disposed between the two first indented portions 205a and 205b, which are spaced apart from each other.

Each of the third indented portions 17a may be disposed between the two first indented portions, which are formed in a corresponding one of the outer surfaces of the base 210.

For example, each of the third indented portions 17a may include an upper opening, which is open to the upper surface of the base 210, and a lower opening, which is open to the groove 201, so that the inner protruding portions 42 of the housing 140 may be easily disposed or seated in the third indented portions 17a.

Figure 17:
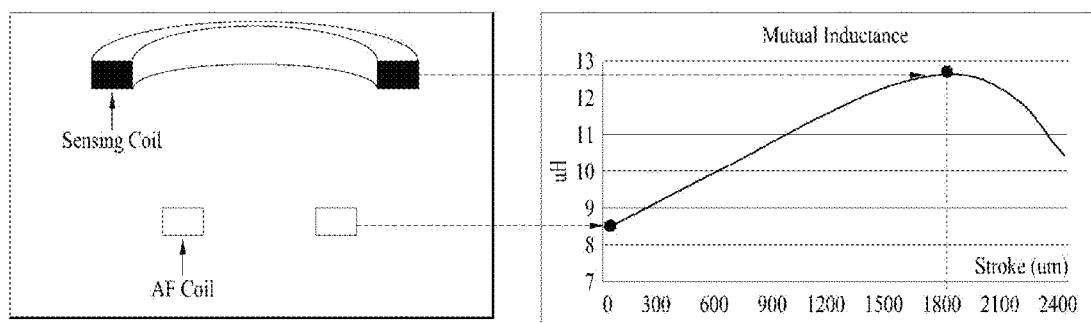
FIG. 17 shows mutual inductance depending on the spacing distance between the first coil and the second coil.

FIG. 17 shows mutual inductance depending on the spacing distance between the first coil and the second coil.

FIG. 17 shows a change in the mutual inductance between the first coil and the second coil depending on the upward movement of the first coil mounted to the bobbin in the structure in which the first coil, which is an AF driving coil, is disposed above the second coil, which is a sensing coil.

Referring to FIG. 17, in the case in which the spacing distance between the first coil and the second coil is less than 100 μm, the linearity of a change in the mutual inductance between the first coil and the second coil depending on a change in the displacement of the bobbin is sharply deteriorated. Since the inductive voltage induced in the second coil is proportional to the mutual inductance between the first coil and the second coil, in the case in which the spacing distance between the first coil and the second coil is less than 100 μm, the linearity of a change in the inductive voltage of the second coil depending on the displacement of the bobbin is sharply deteriorated.

Thus, in the structure in which the first coil, which is an AF driving coil, is disposed above the second coil, which is a sensing coil, in order to secure the linearity of the inductive voltage of the second coil, the spacing distance between the first coil and the second coil when the bobbin is located at the uppermost position needs to be 100 μm or greater. Thus, there is a limitation in designing the arrangement of the first coil and the second coil, and the overall thickness of the lens moving apparatus may be increased.

On the other hand, in the embodiment, since the second coil 170 is disposed at the base 210, which is located below the first coil 120, when the bobbin 110 moves upwards, the first coil 120 and the second coil 170 are separated from each other. Thus, so long as the spacing distance between the first coil 120 and the second coil 170 is about 100 μm when the bobbin 110 is located at an initial position in the unidirectional driving system or when the bobbin 110 is located at the lowermost position in the bidirectional driving system, the linearity of the inductive voltage of the second coil is automatically maintained even when the bobbin 110 moves upwards. Therefore, a limitation in designing the arrangement of the driving coil and the sensing coil 170 may be alleviated, and the thickness of the lens moving apparatus may be reduced.

In the case in which the second coil 170 is disposed at the upper surface of the base 210, the base 210 needs to be formed to have a sufficient thickness in order to inhibit interference with the lower elastic member. However, in the embodiment, since the second coil 170 is disposed at the side surface of the base 210, the thickness of the base 210 may be reduced.

In addition, since the second coil 170 is disposed so as to be wound around the side surface of the base 210, the length per turn of the second coil may be increased. Therefore, compared with the structure in which the second coil is disposed with the same winding number at the upper surface of the base 210, the magnitude of the inductive voltage of the second coil 170 may be increased.

In addition, the winding number of the second coil 170, which is wound around the base 210, may be greater than the winding number of the first coil 120, which is wound around the bobbin 110, without limitation thereto. In another embodiment, the winding number of the second coil 170, which is wound around the base 210, may be less than or equal to the winding number of the first coil 120, which is wound around the bobbin 110.

In general, in order to perform autofocus (AF) feedback control, a position sensor for sensing the displacement of the AF driving unit and an additional power connection structure for driving the position sensor are required, which leads to an increase in the price of the lens moving apparatus and a complicated manufacturing process.

Further, the linear section (hereinafter referred to as a "first linear section") in the graph, which shows the moving distance of the bobbin and the magnetic flux of the magnet sensed by the position sensor, is restricted by the positional relationship between the magnet and the position sensor.

In the embodiment, since an additional position sensor for sensing the displacement of the bobbin 110 is not required, it is possible to reduce the manufacturing costs of the lens moving apparatus and to facilitate the manufacturing process thereof.

In addition, since the mutual induction between the first coil 120 and the second coil 170 is used, the linear section in the graph related to the moving distance of the bobbin 110 and the inductive voltage due to the mutual induction may be increased further than the above-described first linear section. Therefore, according to the embodiment, it is possible to secure a wide range of linearity, to lower a defect rate in the process, and to perform the AF feedback control more accurately.

Figure 18:
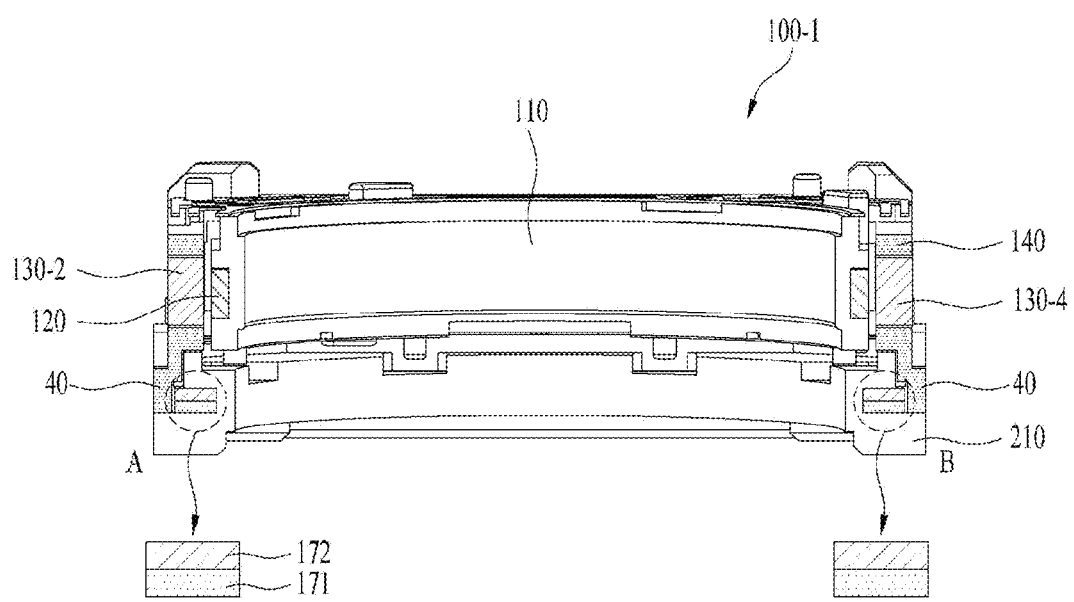
FIG. 18 illustrates a cross-sectional view of a lens moving apparatus according to another embodiment.

FIG. 18 illustrates a cross-sectional view of a lens moving apparatus 100-1 according to another embodiment.

The lens moving apparatus 100-1 shown in FIG. 18 may further include a magnetic member 172, which is disposed on a second coil 171 in order to increase the magnitude of the inductive voltage generated in the second coil 171. The magnetic member 172 may be referred to as a "magnetic body".

The magnetic member 171 and the second coil 171 may have a ring shape and may have the same diameter as each other. As illustrated in FIG. 12, the width of the magnetic member 171 and the width of the second coil 172 may be the same as each other. However, the disclosure is not limited thereto. In another embodiment, the width of the magnetic member 171 may be greater than the width of the second coil 172.

The magnetic member 171 and the second coil 172 may be disposed in a groove 201. The lower surface of the magnetic member 171 may be in contact with the upper surface of the second coil 172.

In another embodiment, the magnetic member 172 may be disposed under the second coil 171.

The magnetic member 171 may be a ferrite core having a magnetic property. For example, the ferrite core may be MnZn or NiZn. The MnZn-based ferrite core may be used for low frequency applications, and the NiZn-based ferrite core may be used for high frequency applications. In another embodiment, the magnetic member 171 may be substituted with an iron core.

Figure 19:
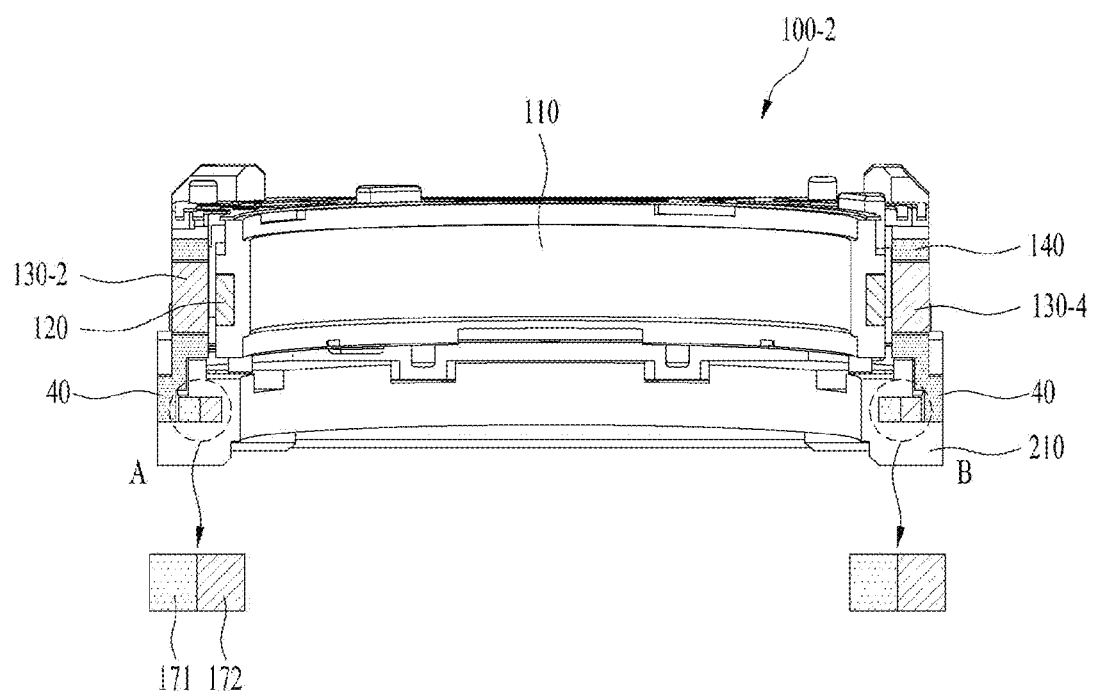
FIG. 19 illustrates a cross-sectional view of a lens moving apparatus according to a further embodiment.

FIG. 19 illustrates a cross-sectional view of a lens moving apparatus 100-2 according to a further embodiment.

Referring to FIG. 19, a magnetic member 171 may be disposed at the outside of a second coil 171. The inner surface of the magnetic member 171 may be in contact with the outer surface of the second coil. In another embodiment, the second coil may be disposed at the outside of the magnetic member, and the outer surface of the magnetic member may be in contact with the inner surface of the second coil.

Figure 20:
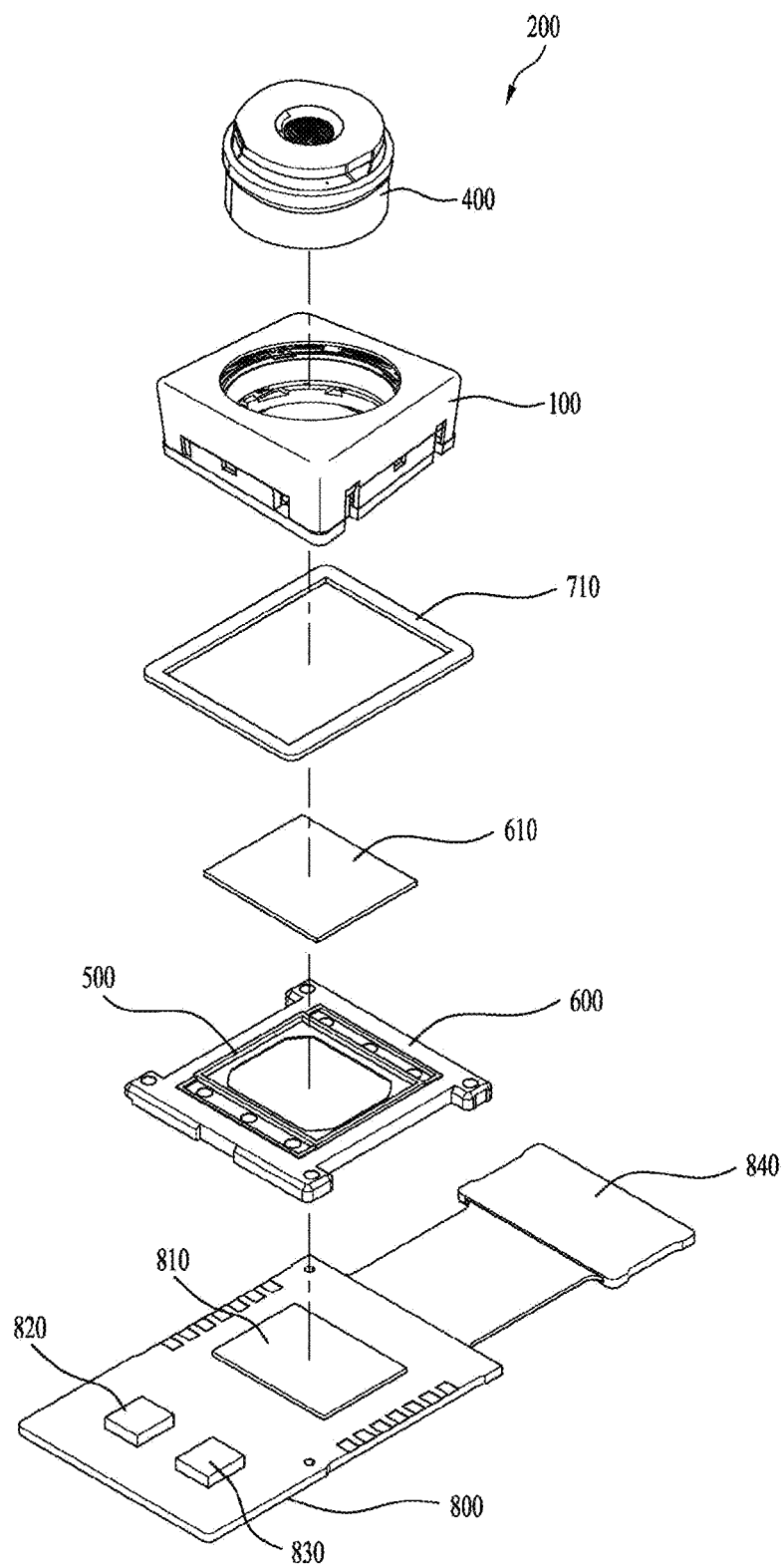
FIG. 20 illustrates an exploded perspective view of a camera module according to an embodiment.

FIG. 20 illustrates an exploded perspective view of a camera module 200 according to an embodiment.

Referring to FIG. 20, the camera module may include a lens or a lens barrel 400, a lens driving device 100, an adhesive member 612, a filter 610, a first holder 600, a second holder 800, an image sensor 810, a motion sensor 820, a controller 830, and a connector 840.

The lens or the lens barrel 400 may be mounted in the bobbin 110 of the lens moving apparatus 100.

The first holder 600 may be disposed under the base 210 of the lens moving apparatus 100. The filter 610 may be mounted on the first holder 600, and the first holder 600 may include a protruding portion 500 on which the filter 610 is seated.

The adhesive member 612 may couple or attach the base 210 of the lens moving apparatus 100 to the first holder 600. The adhesive member 612 may also serve to inhibit foreign substances from being introduced into the lens moving apparatus 100 in addition to the adhesive role described above.

For example, the adhesive member 612 may be an epoxy, a thermosetting adhesive, an ultraviolet curable adhesive, or the like.

The filter 610 may serve to block the light within a specific frequency band of the light that passes through the lens barrel 400 from being incident on the image sensor 810. The filter 610 may be an infrared-light blocking filter, without limitation thereto. Here, the filter 610 may be disposed parallel to the x-y plane.

A hollow region may be formed in a portion of the first holder 600 on which the filter 610 is mounted so that the light, which has passed through the filter 610, may be incident on the image sensor 810.

The second holder 800 may be disposed under the first holder 600, and the image sensor 810 may be mounted on the second holder 800. The image sensor 810 is an element on which the light, which has passed through the filter 610, is incident so that an image including the light is formed.

The second holder 800 may include, for example, various circuits, elements, and a controller for converting the image formed on the image sensor 810 into an electric signal and transmitting the electric signal to an external device.

The second holder 800 may be implemented as a circuit board on which the image sensor may be mounted and a circuit pattern may be formed and to which various elements are coupled.

The image sensor 810 may receive the image included in the light incident through the lens moving apparatus 100, and may convert the received image into an electric signal.

The filter 610 and the image sensor 810 may be spaced apart from each other so as to face each other in the first direction.

The motion sensor 820 may be mounted on the second holder 800, and may be electrically connected to the controller 830 through the circuit pattern provided on the second holder 800.

The motion sensor 820 outputs rotational angular velocity information based on the motion of the camera module 200. The motion sensor 820 may be implemented as a two-axis or three-axis gyro sensor, or an angular velocity sensor.

The controller 830 may be mounted on the second holder 800, and may be electrically connected to the first coil 120 and the second coil 170 of the lens moving apparatus 100. For example, the second holder 800 may be electrically connected to the connection terminals 164-1 to 164-4 of the lens moving apparatus 100.

The controller 830 may output a driving signal to the first coil 120 of the lens moving apparatus 100, and may receive the inductive voltage of the second coil 170.

The connector 840 may be electrically connected to the second holder 800, and may include a port for electrical connection to an external device.

Figure 21:
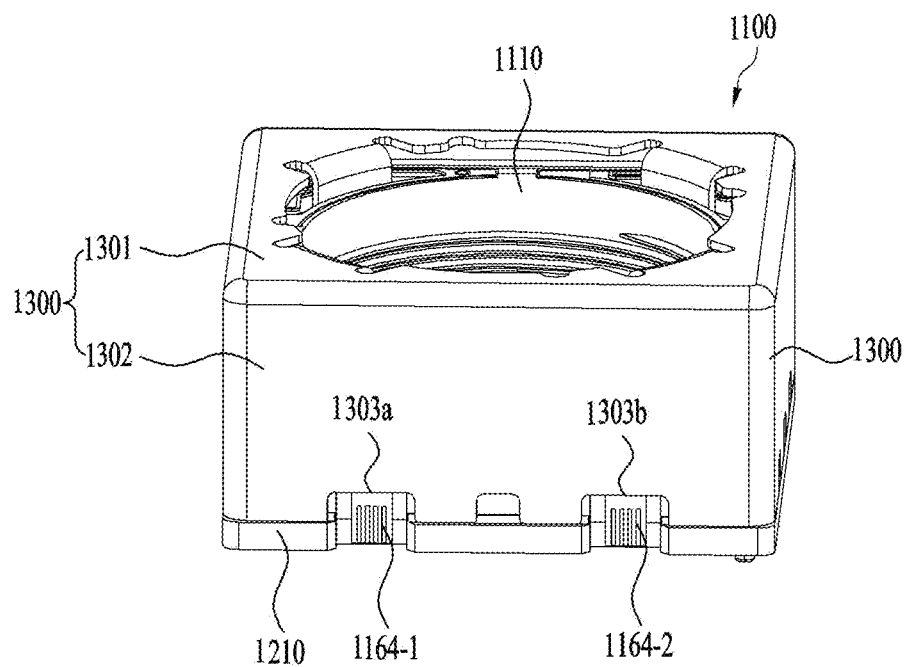
FIG. 21 is a perspective view of a lens moving apparatus according to another embodiment.
Figure 22:
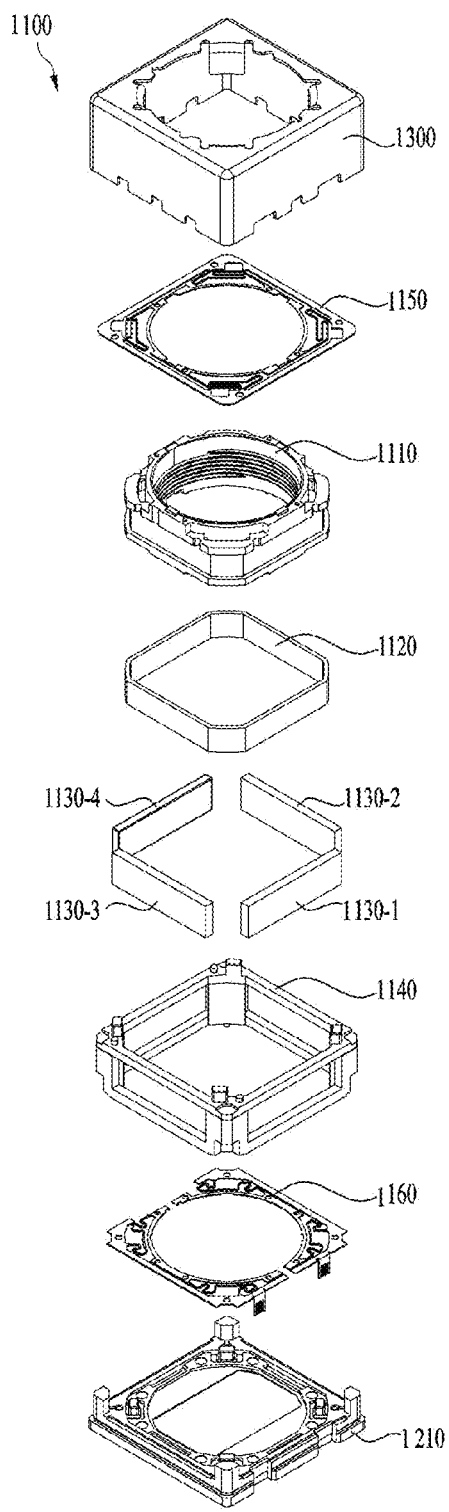
FIG. 22 is an exploded perspective view of the lens moving apparatus shown in FIG. 21.
Figure 23:
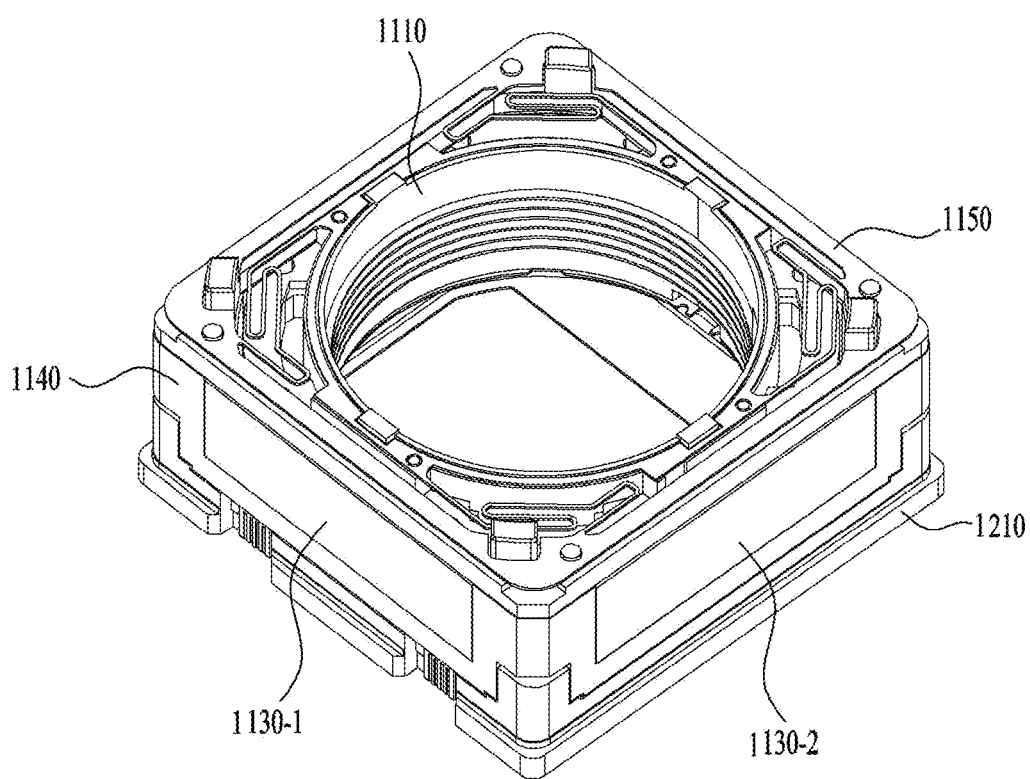
FIG. 23 is a perspective view of the lens moving apparatus shown in FIG. 21 from which the illustration of a cover member is omitted.

FIG. 21 is a perspective view of a lens moving apparatus 1100 according to another embodiment, FIG. 22 is an exploded perspective view of the lens moving apparatus 1100 shown in FIG. 21, and FIG. 23 is a perspective view of the lens moving apparatus 1100 shown in FIG. 21 from which the illustration of a cover member 2300 is omitted.

Referring to FIGS. 21 to 23, the lens moving apparatus 1100 may include a bobbin 1110, a coil 1120, a magnet 1130, a housing 1140, an upper elastic member 1150, and a lower elastic member 1160.

In addition, the lens moving apparatus 1100 may further include a cover member 1300 and a base 1210.

The cover member 1300 accommodates the other components 1110, 1120, 1130, 1140, 1150 and 1160 in an accommodating space defined between the cover member and the base 1210.

The cover member 1300 may take the form of a box having an open bottom, an upper plate 1301 and side plates 1302, and the lower ends of the side plates 1302 of the cover member 1300 may be coupled to the upper portion of the base 1210. The upper plate 1301 of the cover member 1300 may have a polygonal shape, for example, a rectangular shape, an octagonal shape, or the like.

The cover member 1300 may have a hollow region formed in the upper plate thereof to expose a lens (not illustrated), which is coupled to the bobbin 1110, to external light. In addition, the hollow region in the cover member 1300 may be additionally provided with a window formed of a light-transmitting material in order to inhibit foreign substances, such as dust or moisture, from entering the inside of a camera module.

The cover member 1300 may be formed of a nonmagnetic material such as SUS in order to inhibit the cover member from adhering to the magnet 1130, but may be formed of a magnetic material to serve as a yoke.

Next, the bobbin 1110 will be described.

The bobbin 1110 is located inside the housing 1140 and is movable in the first direction (e.g. the Z-axis direction) via electromagnetic interaction between the coil 1120 and the magnet 1130.

Figure 24A:
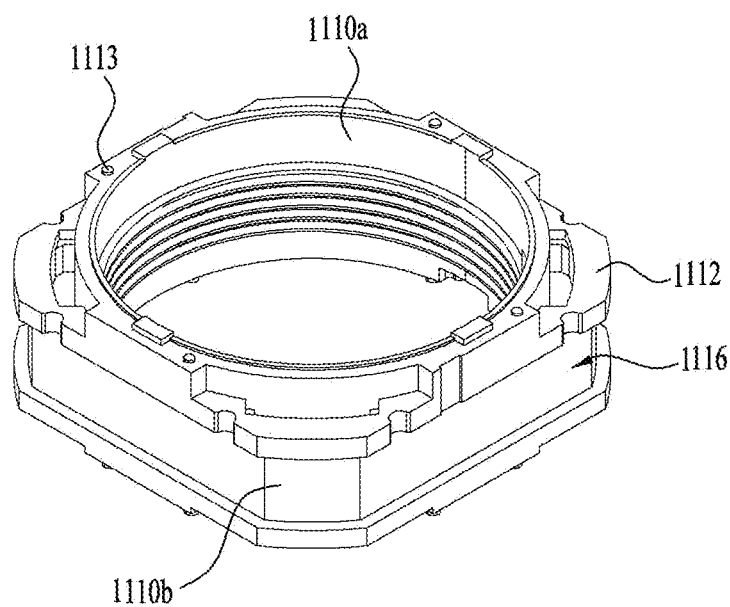
FIG. 24a is a first perspective view of the bobbin shown in FIG. 22.
Figure 24B:
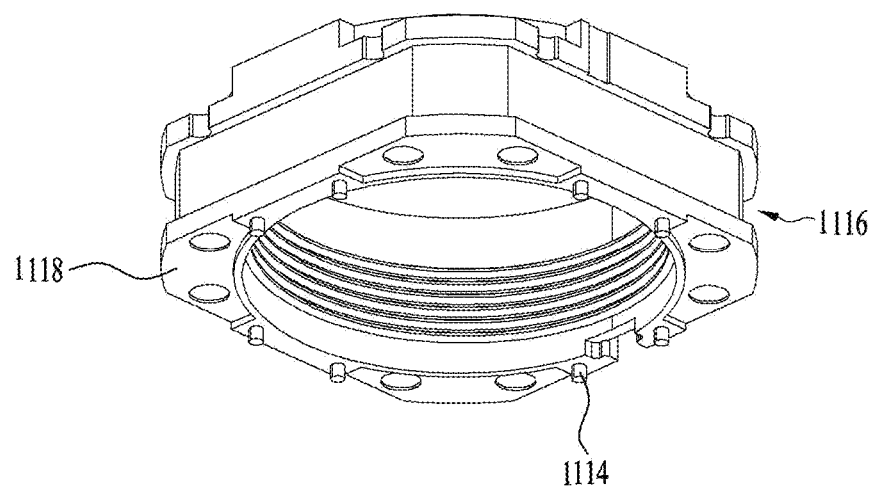
FIG. 24b is a second perspective view of the bobbin shown in FIG. 22.
Figure 24C:
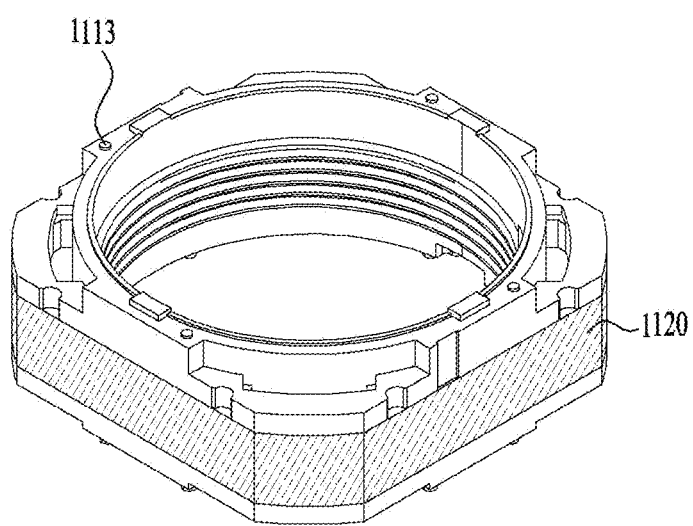
FIG. 24c is a coupled perspective view of the bobbin and the coil.

FIG. 24a is a first perspective view of the bobbin 110 shown in FIG. 22, FIG. 24b is a second perspective view of the bobbin 1110 shown in FIG. 22, and FIG. 24c is a coupled perspective view of the bobbin 1110 and the coil 1120.

Referring to FIGS. 24a and 24b, a lens (not illustrated) may be directly coupled to an inner circumferential surface 1110a of the bobbin 1110, without limitation thereto. For example, the bobbin 1110 may include a lens barrel (not illustrated) in which at least one lens is provided, and the lens barrel may be coupled inside the bobbin 1110 in any of various manners.

The bobbin 1110 may have a hollow region for mounting the lens or the lens barrel. The hollow region of the bobbin 1110 may have the same shape as the lens or lens barrel to be mounted therein, and may have, for example, a circular shape, an elliptical shape, or a polygonal shape, without limitation thereto.

The bobbin 1110 may include at least one upper support protrusion 1113, which is disposed on the upper surface thereof and is coupled and secured to an inner frame 1151 of the upper elastic member 1150, and at least one lower support protrusion 1114, which is disposed on the lower surface thereof and is coupled and secured to an inner frame 1161 of the lower elastic member 1160.

The bobbin 1110 may have an upper avoidance groove 1112 formed in a region of the upper surface thereof corresponding to or aligned with a connection portion 1153 of the upper elastic member 1150. In addition, the bobbin 1110 may have a lower avoidance groove 1118 formed in a region of the lower surface thereof corresponding to or aligned with a connection portion 1163 of the lower elastic member 1160.

When the bobbin 1110 moves in the first direction, spatial interference between the connection portions 1153 and 1163 of the upper and lower elastic members 1150 and 1160 and the bobbin 1110 may be inhibited by the upper avoidance groove 1112 and the lower avoidance groove 1118 in the bobbin 1110, and thus the connection portions 1153 and 1163 of the upper and lower elastic members 1150 and 1160 may be elastically deformed easily.

Alternatively, in another embodiment, the connection portion of the upper elastic member and the bobbin are designed so as to avoid interference therebetween, in which case the upper avoidance groove and/or the lower avoidance groove in the bobbin may not be provided.

The bobbin 1110 may have at least one groove 1116 formed in the outer circumferential surface 1110b thereof, and the coil 1120 may be disposed or seated in the groove 1116 in the bobbin 1110. For example, as illustrated in FIG. 24a, the groove 1116 may take the form of a ring that rotates about the optical axis, without limitation thereto.

The shape and number of grooves 1116 may correspond to the shape and number of coils disposed on the outer circumferential surface 1110b of the bobbin 1110. In another embodiment, the bobbin 1110 may not have a coil seating groove, and the coil 1120 may be directly wound around and secured to the outer circumferential surface 1110b of the bobbin 1110.

Next, the coil 1120 will be described.

The coil 1120 is disposed on the outer circumferential surface 110b of the bobbin 1110 and electromagnetically interacts with the magnet 1130 disposed on the housing 1140.

A driving signal may be applied to the coil 1120 in order to generate an electromagnetic force due to the electromagnetic interaction between the coil and the magnet 1130. The driving signal applied to the coil may include at least one of a direct current signal or an alternating current signal. For example, the driving signal may have the form of voltage or current.

For example, the driving signal may be direct current or alternating current, or may include direct current and alternating current. For example, the alternating current signal may be a sinusoidal signal or a pulse signal (e.g. a PWM signal).

An AF driving unit, which is elastically supported by the upper and lower elastic members 1150 and 1160, may be moved in the first direction by the electromagnetic force due to the electromagnetic interaction between the coil 120 and the magnet 1130. The movement of the bobbin 1110 in the first direction may be controlled by controlling the electromagnetic force, whereby an auto-focusing function may be performed.

The AF driving unit that is the same as in the embodiment shown in FIG. 1 may be used. For example, the AF driving unit may include a bobbin 110 and a coil 120. In addition, the AF driving unit may further include, for example, a lens (not illustrated) mounted on the bobbin 110.

Referring to FIG. 24c, the coil 1120 may have a closed loop shape, e.g. a ring shape.

For example, the coil 1120 may be wound around the outer circumferential surface 1110b of the bobbin 1110 so as to rotate in a clockwise or counterclockwise direction about the optical axis.

For example, the coil 1120 may be disposed in or wound around the groove 1116 formed in the outer circumferential surface 1110b of the bobbin 1110.

For example, the coil 1120 may be implemented in the form of a ring that surrounds the outer circumferential surface 1110b of the bobbin 110 in a clockwise or counterclockwise direction about the optical axis. As illustrated in FIG. 24a, the coil 1120 may be formed in the shape of a single ring.

In another embodiment, the coil 1120 may be implemented in the form of a coil ring that is wound in a clockwise or counterclockwise direction about an axis perpendicular to the optical axis, and the number of coil rings may be the same as the number of magnets 1130, without limitation thereto.

The coil 1120 may be electrically connected to at least one of the upper elastic member 1150 or the lower elastic member 1160. For example, the coil 1120 may be electrically connected to lower springs 1160-1 and 1160-2, and the driving signal may be applied to the coil 1120 through the lower springs 1160-1 and 1160-2.

Next, the housing 1140 will be described.

Figure 25A:
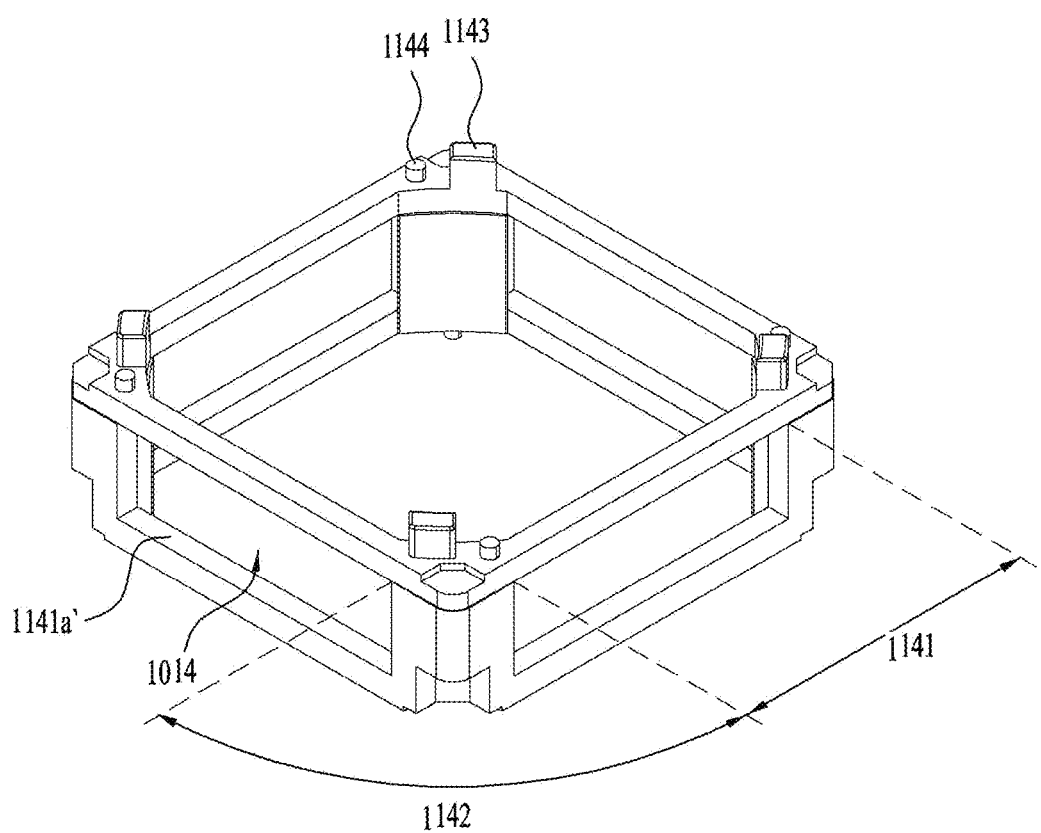
FIG. 25a is a first perspective view of the housing shown in FIG. 22.
Figure 25B:
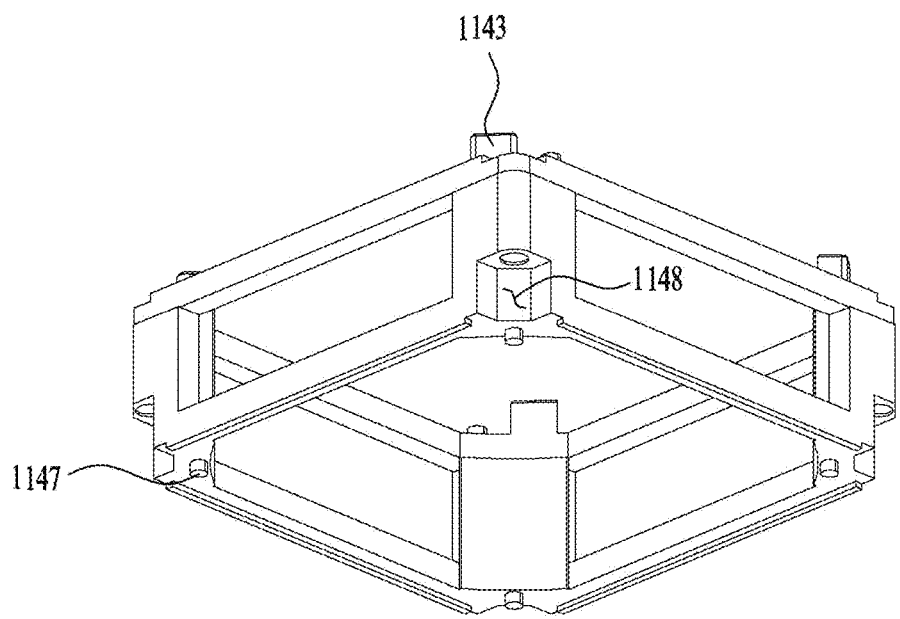
FIG. 25b is a second perspective view of the housing shown in FIG. 22.
Figure 25C:
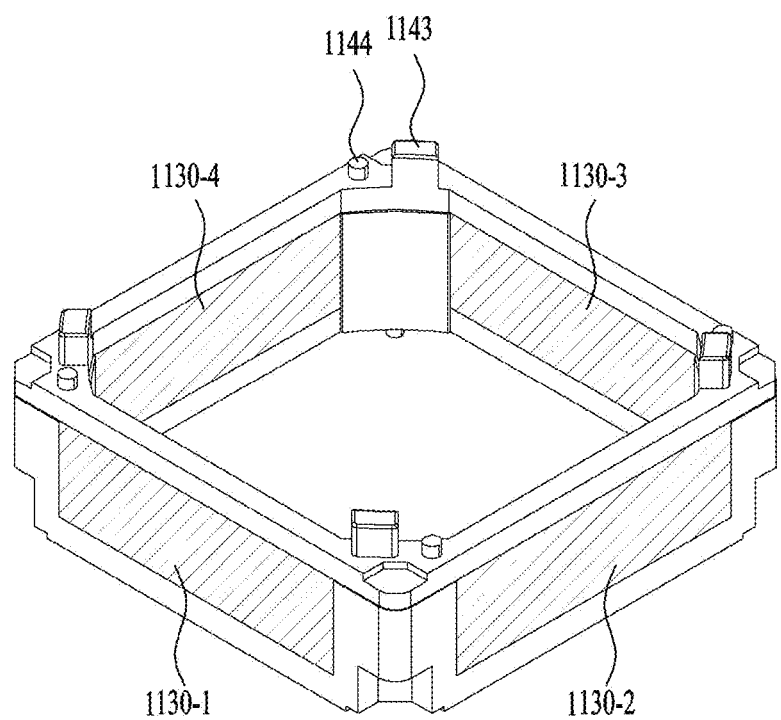
FIG. 25c is a coupled perspective view of the housing and the magnet.

FIG. 25a is a first perspective view of the housing 1140 shown in FIG. 22, FIG. 25b is a second perspective view of the housing 1140 shown in FIG. 22, and FIG. 25c is a coupled perspective view of the housing 1140 and the magnet.

Referring to FIGS. 25a to 25c, the housing 1140 supports the magnet 1130 and accommodates the AF driving unit, e.g. the bobbin 110 therein, so as to allow the bobbin 1110 to be moved in the first direction.

The housing 1140 may have a hollow column shape overall, and may include a plurality of side portions 1141 and 1142, which form a hollow region therein.

For example, the housing 1140 may include the side portions 1141 and 1142, which form a polygonal (e.g. rectangular or octagonal) or circular hollow region therein. The upper surfaces of the side portions 1141 and 1142 may define the upper surface of the housing 1140.

For example, the housing 1140 may include first side portions 1141, which are spaced apart from each other, and second side portions 1142, which are spaced apart from each other. Each of the second side portions 1142 may be disposed between two adjacent ones of the first side portions.

For example, the length of each of the first side portions 1141 of the housing 1140 may be greater than the length of each of the second side portions 1142. For example, the first side portions 1141 of the housing 1140 may correspond to the sides of the housing 1140, and may be referred to as "side portions".

The second side portions 1142 of the housing 1140 may correspond to the corners of the housing 1140, and may be referred to as "corner portions".

The magnet 1130 may be disposed or installed on the first side portions 1141 of the housing 1140. For example, each of the first side portions 1141 of the housing 1140 may be provided therein with a groove 1014, in which the magnet 1130 is seated, disposed or secured. As illustrated in FIG. 25a, the groove 1014 for the magnet is formed through the first side portion, without limitation thereto. The groove 1014 may be formed such that it is recessed in the first side portion.

The housing 1140 may include a first stopper 1143, which protrudes from the upper surface thereof.

The first stopper 1143 of the housing 1140 functions to inhibit collision between the cover member 1300 and the housing 1140. The first stopper 1143 may inhibit the upper surface of the housing 1140 from directly colliding with the upper inner surface of the cover member 1300 due to external shocks.

In addition, the housing 1140 may include an upper frame support protrusion 1144, which is formed on the upper surface thereof so as to be coupled with an outer frame 1152 of the upper elastic member 1150. The housing 1140 may include a lower frame support protrusion 1147, which is formed on the lower surface thereof so as to be coupled with an outer frame 1162 of the lower elastic member 1160.

In addition, the housing 1140 may have a lower guide recess 1148, which is formed in each of the lower portions of the second side portions 1142 thereof. A guide member 1216 of the base 1210 may be inserted into, fastened into or coupled to the lower guide recess 1148. The lower guide recess 1148 of the housing 1140 and the guide member 1216 of the base 1210 may be coupled to each other via an adhesive member (not illustrated), whereby the housing 1140 may be coupled to the base 1210.

Next, the magnet 1130 will be described.

Referring to FIG. 25c, the magnet 1130 may be disposed on the side portions of the housing 1140. For example, the magnet 1130 may be disposed on the first side portions 1141 of the housing 1140, without limitation thereto. In another embodiment, the magnet may be disposed on the second side portions of the housing 1140.

At the initial position of the AF driving unit, e.g. the initial position of the bobbin 1110, the magnet 1130 disposed on the housing 1140 may overlap at least a portion of the coil 1120 in a direction perpendicular to the optical axis. The initial position of the AF driving unit may be the same as in the embodiment described above with reference to FIG. 1.

For example, the magnet 1130 may be disposed in the groove 1014 in the first side portions 1141 of the housing 1140 so as to overlap the coil 1120 in the second direction or in the third direction.

In another embodiment, the groove 1014 may not be formed in the first side portions 1141 of the housing 1140, and the magnet 1130 may be disposed on any one of the outer surface and the inner surface of each of the first side portions 1141 of the housing 1140.

The magnet 1130 may have a shape corresponding to the shape of each of the first side portions 1141 of the housing 1140, for example, may have a rectangular parallelepiped shape, without limitation thereto.

The magnet 1130 may be a monopolar-magnetized magnet or a bipolar-magnetized magnet, which is disposed such that a first surface thereof that faces the coil 1120 is an S pole and a second surface thereof that is opposite the first surface is an N pole. However, the disclosure is not limited thereto, and the poles of the magnet may be reversed.

The magnet 1130 may be provided in a plural number. For example, the magnet 1130 may include first to fourth magnets 1130-1 to 1130-4. Although, in the embodiment, the number of magnets 1130 is four, the disclosure is not limited thereto. At least two magnets 130 may be provided. The surface of each of the magnets 1130 that faces the coil 1120 may be formed in the shape of a planar surface, without limitation thereto. The surface of each of the magnets 1130 that faces the coil 1120 may be formed in the shape of a curved surface.

Next, the upper elastic member 1150 and the lower elastic member 1160 will be described.

Figure 26:
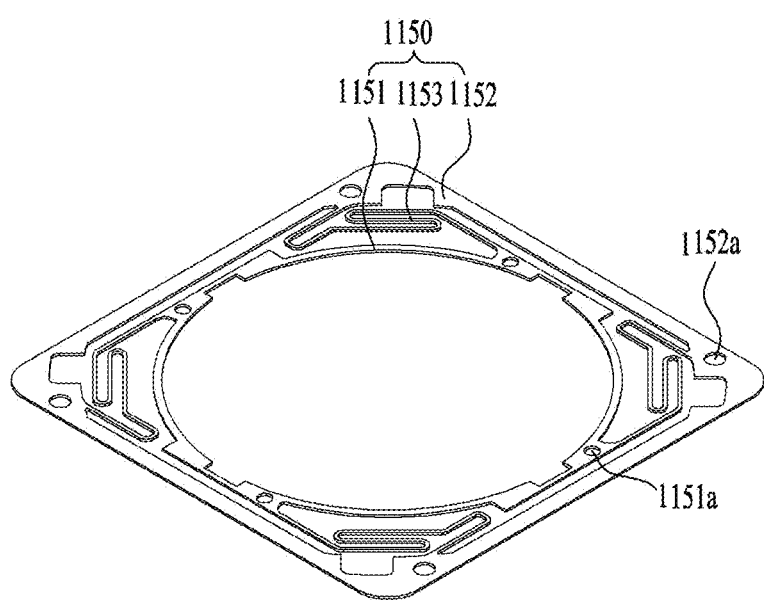
FIG. 26 illustrates the upper elastic member shown in FIG. 22.
Figure 27:
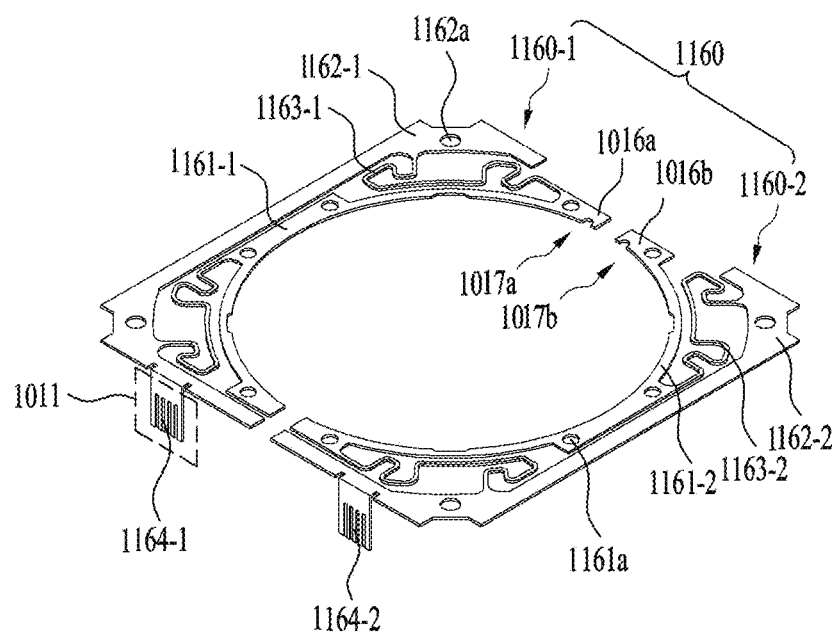
FIG. 27 illustrates the lower elastic member shown in FIG. 22.

FIG. 26 illustrates the upper elastic member 1150 shown in FIG. 22, and FIG. 27 illustrates the lower elastic member 1160 shown in FIG. 22.

The upper elastic member 1150 and the lower elastic member 1160 are coupled to the bobbin 1110 and the housing 1140 and elastically support the bobbin 1110.

For example, the upper elastic member 1150 may be coupled to the upper portion, the upper surface or the upper end of the bobbin 1110 and to the upper portion, the upper surface or the upper end of the housing 1140. The lower elastic member 1160 may be coupled to the lower portion, the lower surface or the lower end of the bobbin 1110 and to the lower portion, the lower surface or the lower end of the housing 1140.

The upper elastic member 1150 shown in FIG. 26 is implemented as an upper spring having an integrated structure. However, the disclosure is not limited thereto. In another embodiment, the upper elastic member may include a plurality of upper springs, which are spaced or separated apart from each other.

Referring to FIG. 27, the lower elastic member 1160 may include first and second lower springs 1160-1 and 1160-2, which are spaced apart from each other. The first and second lower springs 1160-1 and 1160-2 may be electrically disconnected from each other.

Each of the upper elastic member 1150 and the lower elastic member 1160 may be embodied as a leaf spring, without limitation thereto. Each of the upper elastic member 1150 and the lower elastic member 1160 may be embodied as a coil spring, a suspension wire, or the like.

The upper elastic member 1150 may include a first inner frame 1151, which is coupled to an upper support protrusion 1113 of the bobbin 1110, a first outer frame 1152, which is coupled to an upper frame support protrusion 1144 of the housing 1140, and a first connection portion 1153, which connects the first inner frame 1151 and the first outer frame 1152 to each other.

For example, the upper elastic member 1150 may be provided in the first inner frame 1151 thereof with a through-hole 1151a, into which the upper support protrusion 1113 of the bobbin 1110 is coupled, and may be provided in the first outer frame 1152 thereof with a through-hole 1152a, into which the upper frame support protrusion 1144 of the housing 1140 is coupled.

Each of the first and second lower springs 1160-1 and 1160-2 may include a second inner frame 1161, which is coupled to a lower support protrusion 1114 of the bobbin 1110, a second outer frame 1162, which is coupled to a lower frame support protrusion 1147 of the housing 1140, and a second connection portion 1163, which connects the second inner frame 1161 and the second outer frame 1162 to each other.

For example, each of the first and second lower springs 1160-1 and 1160-2 may be provided in the second inner frame 1161 thereof with a through-hole 1161a, into which the lower support protrusion 1114 of the bobbin 1110 is coupled, and may be provided in the second outer frame 1162 thereof with a through-hole 1162a, into which the lower frame support protrusion 1147 of the housing 1140 is coupled.

Each of the first and second connection portions 1153 and 1163 may be bent or curved at least once so as to form a predetermined pattern. The upward and/or downward movement of the bobbin 1110 in the first direction may be flexibly (or elastically) supported by positional change or fine deformation of the first and second connection portions 1153 and 1163.

The coil 1120 may be coupled to the second inner frames 1161 of the first and second lower springs 1160-1 and 1160-2, and may be electrically connected to the first and second lower springs 1160-1 and 1160-2.

For example, a first bonding portion 1016a, to which one end of the coil 120 is bonded, may be provided on the upper surface of one end of the second inner frame 1161 of the first lower spring 1160-1, and a second bonding portion 1016b, to which the opposite end of the coil 1120 is bonded, may be provided on the upper surface of one end of the second inner frame 1161 of the second lower spring 1160-2.

In addition, a first guide recess 1017a for guiding one end of the coil 1120 may be formed in one side surface of one end of the second inner frame 1161 of the first lower spring 1160-1. The first guide recess 1017a may be located adjacent to the first bonding portion 1016a.

In addition, a second guide recess 1017b for guiding one end of the coil 1120 may be formed in one side surface of one end of the second inner frame 1161 of the second lower spring 1160-2. The second guide recess 1017b may be located adjacent to the second bonding portion 1016b.

The coil 1120 may be bonded to the first and second bonding portions 1016a and 1016b using a conductive adhesive member such as solder.

In order to inhibit oscillation while the bobbin 1110 moves, a damper may be disposed between the first connection portion 1153 of the upper elastic member 1150 and the upper surface of the bobbin 1110. Alternatively, a damper (not illustrated) may also be disposed between the second connection portion 1163 of the lower elastic member 1160 and the lower surface of the bobbin 1110.

Alternatively, a damper may be applied to the coupling portion between the upper elastic member 1150 and each of the bobbin 1110 and the housing 1140 or to the coupling portion between the lower elastic member 1160 and each of the bobbin 1110 and the housing 1140. For example, the damper may be gel-type silicon.

In the embodiment, since the coil 120 is connected to the first and second bonding portions 1016a and 1016b, which are provided at the second inner frames 1161 of the lower springs 1160-1 and 1160-2, it is possible to reduce the distance between the coil 1120 and the first and second bonding portions 1016a and 1016b of the lower springs 1160-1 and 1160-2 for bonding to the coil 1120 and consequently to further facilitate the bonding. In the first and second bonding portions 1016a and 1016b described above, the term "bonding portion" may be referred to as a pad portion, a connection terminal, a solder portion, or an electrode portion.

Figure 28:
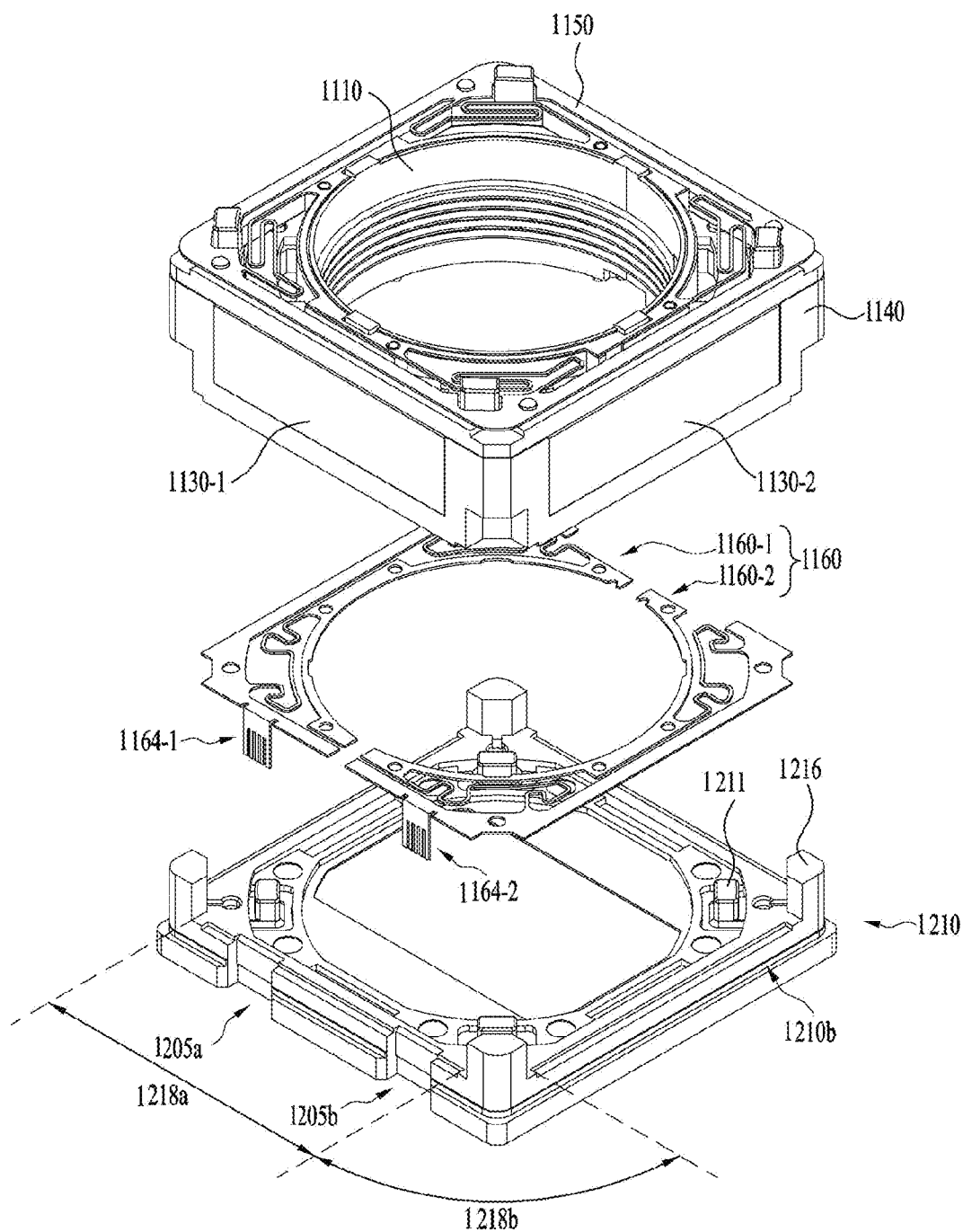
FIG. 28 illustrates an exploded perspective view of the base and the lower elastic member shown in FIG. 22.
Figure 29:
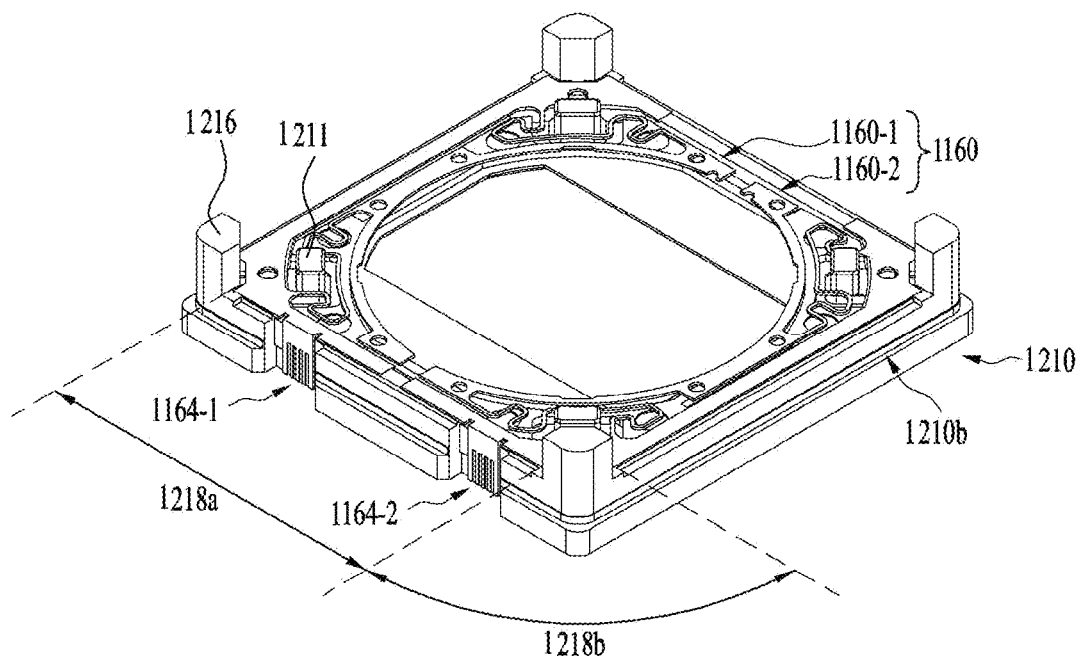
FIG. 29 illustrates a coupled perspective view of the base and the lower elastic member shown in FIG. 28.

FIG. 28 illustrates an exploded perspective view of the base 1210 and the lower elastic member 1160 shown in FIG. 22, and FIG. 29 illustrates a coupled perspective view of the base 1210 and the lower elastic member 1160 shown in FIG. 28.

Referring to FIGS. 28 and 29, each of the first and second lower springs 1160-1 and 1160-4 may be disposed on the upper surface of the base 1210.

The first and second lower springs 1160-1 and 1160-2 may include first and second connection terminals 1164-1 and 1164-2, respectively, for electric connection to the outside. In the first and second connection terminals 1164-1 and 1164-2, the term "connection terminal" may be referred to as a pad portion, a bonding portion, a solder portion, or an electrode portion.

For example, each of the first and second connection terminals 1164-1 and 1164-2 may be connected to the outer surface of the second outer frame 1163 of a corresponding one of the first and second lower springs 1160-1 and 1160-1, and may be bent and extent toward the base 1210.

For example, one end of the first connection terminal 1164-1 may be connected to the outer surface of the second outer frame 1163 of the first lower spring 1160-1, and the opposite end thereof may extend toward the lower surface of the base 1210.

In addition, one end of the second connection terminal 1164-2 may be connected to the outer surface of the second outer frame 1163 of the second lower spring 1160-2, and the opposite end thereof may extend toward the lower surface of the base 1210.

The first and second connection terminals 1164-1 and 1164-2 of the first and second lower springs 1160-1 and 1160-2 may be disposed on the first outer surface of the base 1210 so as to be spaced apart from each other, and may be in contact with the first outer surface of the base 1210.

For example, the first and second connection terminals 1164-1 and 1164-2 may be disposed on any one of the outer surfaces of the base 1210. The reason for this is to facilitate the soldering process for electric connection to the outside. However, the disclosure is not limited thereto. In another embodiment, the first and second connection terminals of the first and second lower springs may be disposed on two different outer surfaces of the base 1210.

The base 1210 may be coupled to the housing 1140, and may form an accommodating space together with the cover member 1300 to accommodate the bobbin 1110 and the housing 1140. The base 1210 may have therein a hollow region corresponding to the hollow region in the bobbin 1110 and/or the hollow region in the housing 1140. The base 1210 may have a shape that matches or corresponds to the shape of the cover member 1300, for example, a rectangular shape.

The base 1210 may include a guide member 1216, which protrudes a predetermined height in an upward direction from each of the four corner portions thereof. For example, the guide member 1216 may be formed in the shape of a polyprism that protrudes from the upper surface of the base 1210 so as to be perpendicular to the upper surface of the base 1210. However, the disclosure is not limited thereto.

The guide member 1216 may be inserted, fastened or coupled to the lower guide recess 1148 in the housing 1140 using an adhesive member (not illustrated) such as epoxy or silicon.

The base 1210 may include first side portions 1218a corresponding to or aligned with the first side portions 1141 of the housing 1140 and second side portions 1218b corresponding to or aligned with the second side portions 1142 of the housing 1140. The first side portions 1218a of the base 1210 may have flat outer surfaces, and the second side portions 1218b of the base 1210 may have curved outer surfaces.

Each of the second side portions 1218b of the base 1210 may connect two adjacent first side portions 1218a to each other, and may be located at the corner of the base. For example, the first side portions 1218a of the base 1210 may be referred to as "side portions" of the base 1210, and the second side portions 1218b may be referred to as corner portions. For example, the guide member 1216 may be disposed at the second side portions 1218b of the base 1210.

The base 1210 may be provided in the outer surface thereof with first and second indented portions 1205a and 1205b, which correspond to the first and second connection terminals 1164-1 and 1164-2 of the first and second lower springs 1160-1 and 1160-2.

For example, the first and second indented portions 1205a and 1205b may be formed in the outer surface of at least one of the first side portions 1218a of the base 1210.

For example, the first and second indented portions 1205a and 1205b may be disposed on the outer surface of any one of the first side portions 1218a of the base 1210 so as to be spaced apart from each other.

For example, each of the first and second indented portions 1205a and 1205b may include an upper opening, which is open to the upper surface of the base 1210, and a lower opening, which is open to the lower surface of the base 1210.

For example, the inner surface of each of the first and second connection terminals 1164-1 and 1164-2 may be in contact with one surface (e.g. the bottom surface) of a corresponding one of the first and second indented portions 1205a and 1205b.

The outer surfaces of the first and second connection terminals 1164-1 and 1164-2, which are disposed in the first and second indented portions 1205a and 1205b, may be exposed from the outer surface of the base 1210.

Further, the lower end of each of the first and second connection terminals 1164-1 and 1164-2 may be exposed from the lower surface of the base 1210. However, the disclosure is not limited thereto. In another embodiment, the lower end of each of the first and second connection terminals may not be exposed from the lower surface of the base 1210.

In order to receive power or signals from the outside, the first and second connection terminals 1164-1 and 1164-2 may be electrically connected to external wires or to external elements using a conductive member, e.g. using soldering or the like.

In the case in which solders bonded to the first and second connection terminals 1164-1 and 1164-2 protrude to the outside of the outer surface of the base 1210, the solders bonded to the first and second connection terminals 1164-1 and 1164-2 and the inner surface of the cover member 1300 may contact or collide each other, leading to an electrical short or disconnection. In the embodiment, the first and second indented portions 1205a and 1205b are formed with a sufficient depth to inhibit the solders bonded to the first and second connection terminals 1164-1 and 1164-2 from protruding to the outside of the outer surface of the base 1210, thereby inhibiting the above-mentioned electrical short or disconnection.

In addition, a stepped portion 1210b may be formed at the lower end of the outer surface of the base 1210. The stepped portion 1210b may be in contact with the lower ends of the side plates 1302 of the cover member 1300 and may guide the cover member 1300. Here, the stepped portion 1210b of the base 1210 and the lower ends of the side plates of the cover member 1300 may be adhered to each other and sealed by an adhesive or the like.

The base 1210 may include protruding portions 1211, which protrude from the upper surface thereof in the optical-axis direction, and the protruding portions of the base 1210 may guide the first and second connection portions 1163 of the lower springs 1160-1 and 1160-2.

Referring to FIG. 21, any one of the side plates 1302 of the cover member 1300 may include recesses 1303a and 1303b, through which the first and second connection terminals 1164-1 and 1164-2 disposed at the base 1210 are exposed.

Each of the upper spring 1150 and the first and second lower springs 1160-1 and 1160-2 may include a first conductive layer 1051 (refer to FIG. 31), which is formed of a conductive metal material or an alloy.

For example, the first conductive layer 1051 may be stainless-based metal, or may be an alloy that includes at least one of nickel (Ni), copper (Cu), tin (Sn), aluminum (Al), or gold (Au).

In addition, each of the first and second lower springs 1160-1 and 1160-2, which include the first and second connection terminals 1164-1 and 1164-2, may further include a first conductive layer 1051 (refer to FIG. 31) and a second conductive layer 1052 (refer to FIG. 31) disposed on the first conductive layer 1051.

For example, the second conductive layer 1052 may be a plating layer, and the plating layer may include at least one of nickel (Ni), copper (Cu), tin (Sn), or gold (Au). The plating layer may serve to facilitate soldering to the lower springs 1160-1 and 1160-2 and to inhibit corrosion of the first and second lower springs 1160-1 and 1160-2.

Figure 30A:
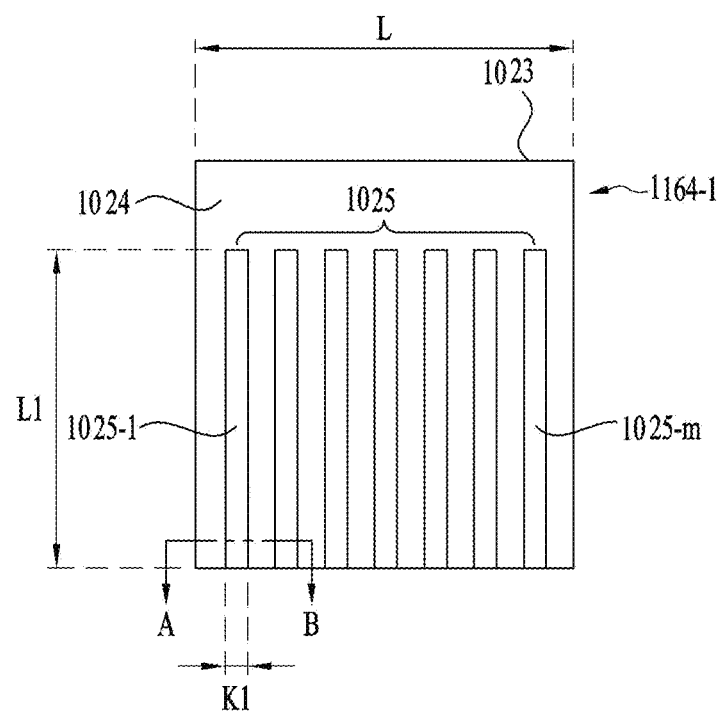
FIG. 30a illustrates an enlarged view of the first connection terminal shown in FIG. 9.
Figure 30B:
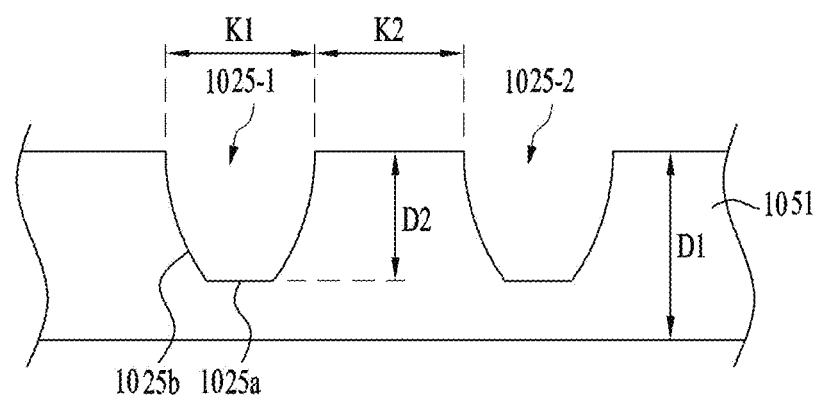

FIG. 30*a* illustrates an enlarged view of the first connection terminal 1164-1 shown in FIG. 9, and FIG. 30*b* illustrates a cross-sectional view of the first connection terminal 1164-1 taken in the direction AB in FIG. 30*a*.

Referring to FIGS. 30*a* and 30*b*, each of the first and second lower springs 1160-1 and 1160-2 may include only a first conductive layer 1051.

The first connection terminal 1164-1 may include an uneven portion 1025, which is formed on the surface, e.g. the outer surface 1024 thereof.

The uneven portion 1025 may include a plurality of concave portions 1025-1 to 1025-*m* (where m is a natural number greater than 1), which are spaced apart from each other. In addition, the uneven portion 1025 may include a convex portion 1025-2, which is located between two adjacent concave portions.

Each of the concave portions 1025-1 to 1025-*m* (where m is a natural number greater than 1) may have a straight line shape, without limitation thereto.

For example, each of the concave portions 1025-1 to 1025-*m* (where m is a natural number greater than 1) may have the shape of a straight line that has a length in the optical-axis direction that is greater than a width, and may be arranged in a width direction.

At least one of the concave portions 1025-1 to 1025-*m* (where m is a natural number greater than 1) may include a bottom 1025*a* and a side wall 1025*b*. The side wall 1025*b* may be an inclined surface that is inclined with respect to the bottom. For example, the side wall 1025*b* may be a curved surface, without limitation thereto.

The concave portions 1025-1 to 1025-*m* (where m is a natural number greater than 1) may take the form of a recess that does not penetrate the first connection terminal 1164-1. In the case in which the concave portions 1025-1 to 1025-*m* (where m is a natural number greater than 1) takes the form of a through-hole, the durability of the first connection terminal 1164-1 is lowered, and the bonding by soldering is not facilitated.

The first length L1 of each of the concave portions 1025-1 to 1025-*m* (where m is a natural number greater than 1) in the optical-axis direction may be different from the width K1 of each of the concave portions 1025-1 to 1025-*m* (where m is a natural number greater than 1). Here, the width K1 of each of the concave portions 1025-1 to 1025-*m* (where m is a natural number greater than 1) may be a second length of each of the concave portions 1025-1 to 1025-*m* (where m is a natural number greater than 1) in a direction perpendicular to the optical axis.

For example, the first length L1 may be greater than the second length K1 (L1>K1), without limitation thereto. In another embodiment, the first length may be less than the second length.

The second length K1 of each of the concave portions 1025-1 to 1025-*m* (where m is a natural number greater than 1) may be gradually decreased from the upper end of each of the concave portions to the lower end thereof.

For example, the first length L1 may range from 0.5 mm to 0.9 mm. Alternatively, in another embodiment, the first length L1 may range from 0.6 mm to 0.7 mm.

For example, the second length K1 may range from 0.05 mm to 0.09 mm. Alternatively, in another embodiment, the second length K1 may range from 0.06 mm to 0.08 mm.

The depth D2 of each of the concave portions 1025-1 to 1025-*m* (where m is a natural number greater than 1) may range from 20% to 70% of the thickness D1 of the first connection terminal 164-1. For example, D2 may be a depth from the outer surface 1024 of the first connection terminal 1164-1 to the bottom of each of the concave portions 1025-1 to 1025-*m* (where m is a natural number greater than 1).

For example, the bottom of each of the concave portions 1025-1 to 1025-*m* (where m is a natural number greater than 1) may be the lowest portion of each of the concave portions 1025-1 to 1025-*m* (where m is a natural number greater than 1). Further, the thickness D1 of the first connection terminal 1164-1 may be a thickness of the first conductive layer 1051 of each of the first and second lower springs 1164-1 and 1164-2.

In the case in which D2 is less than 20% of D1, the depth of the concave portions 1025-1 to 1025-*m* (where m is a natural number greater than 1) is small, which leads to a decrease in the contact area with the solder and minor improvement of solderability.

On the other hand, in the case in which D2 is greater than 70% of D1, the depth of the concave portions is too large, which leads to deterioration in the durability of the first connection terminal 1164-1, deformation or damage to the first connection terminal 1164-1 during the soldering, and deterioration in the solderability.

Further, in order to secure improvement of the solderability and the durability of the first connection terminal simultaneously, the depth D2 of each of the concave portions 1025-1 to 1025-*m* (where m is a natural number greater than 1) may range from 30% to 50% of the thickness D1 of the first connection terminal 164-1.

For example, the length L of the first connection terminal 164-1 in a direction perpendicular to the optical axis may range from 0.1 mm to 1 mm, without limitation thereto. For example, L may range from 0.1 mm to 0.8 mm. Further, for example, L may be 0.75 mm.

D1 may range from 0.01 mm to 0.09 mm, without limitation thereto. For example, D1 may range from 0.03 mm to 0.06 mm.

Further, the spacing distance K2 between two adjacent concave portions may be equal to or less than the second length K1 of the concave portions (K2<K1), without limitation thereto.

In another embodiment, the spacing distance K2 between two adjacent concave portions may be greater than the second length K1 of the concave portions (K2>K1).

As illustrated in FIG. 30*a*, the lower ends of the concave portions 1025-1 to 1025-*m* (where m is a natural number greater than 1) may be in contact with the lower end of the first connection terminal 1164-1. Thereby, it is possible to increase coupling force between the first connection terminal 1164-1 of the lens moving apparatus 1100 and an external element, such as a circuit board of a camera module, using soldering.

As illustrated in FIG. 30*a*, the upper ends of the concave portions 1025-1 to 1025-*m* (where m is a natural number greater than 1) are spaced apart from the upper end of the first connection terminal 1164-1. However, the disclosure is not limited thereto. In another embodiment, the upper end of each of the concave portions 1025-1 to 1025-*m* (where m is a natural number greater than 1) may be in contact with the upper end of the first connection terminal 1164-1. Here, the upper end of the first connection terminal 1164-1 may be a boundary portion between the first connection terminal 1164-1 and the second outer frame 1162 of the first lower spring 1160-1.

The concave portions 1025-1 to 1025-*m* (where m is a natural number greater than 1) shown in FIGS. 30a and 30b may be formed through selective etching. The surfaces of the concave portions 1025-1 to 1025-*m* (where m is a natural number greater than 1), which are etching surfaces, e.g. the bottom 1025a and the side wall 1025b of each of the concave portions, are rougher than the surfaces of the second inner frame 1161, the connection portion 1163 and the second outer frame 1162 of the first lower spring 1160-1.

Since the surface roughness of the concave portions 1025-1 to 1025-*m* (where m is a natural number greater than 1) is larger than the surface roughness of the second inner frame 1161, the connection portion 1163 and the second outer frame 1162 of the first lower spring 1160-1, the solderability may be improved. For example, the surface roughness may be an arithmetic mean value of each of the parameters (e.g. the center line average height, the maximum height, peak to valley height, or the like), which represent the surface roughness of each of the segments obtained from the surface of an object (hereinafter referred to as an "object surface"). For example, the surface roughness may conform to the surface roughness defined and listed in the Korean Industrial Standards (KS) or the surface roughness defined and listed in the DIN ISO, without limitation thereto.

Figure 31:
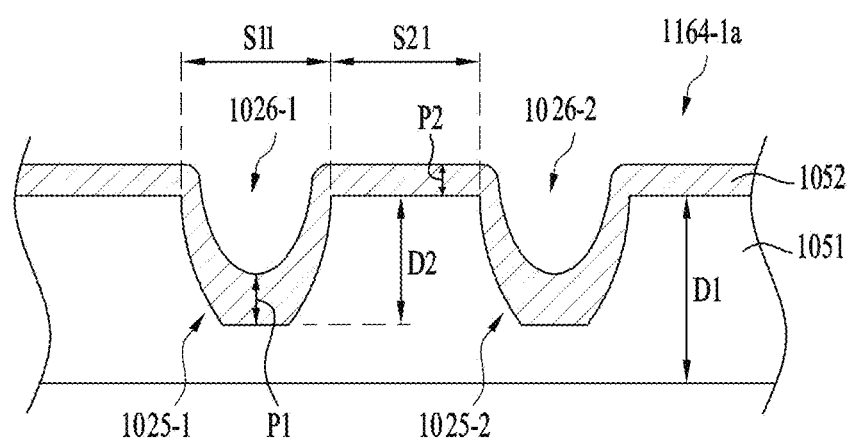

FIG. 31 illustrates a cross-sectional view of another example 1164-1a of the first connection terminal shown in FIG. 30a.

The first lower spring, which includes the first connection terminal 1164-1a shown in FIG. 31, may include a first conductive layer 1051 and a second conductive layer 1052 disposed on the first conductive layer 1051.

The second conductive layer 1052 may be a plating layer, and may be disposed on the surface of the first lower spring 1161-1.

For example, the second conductive layer 1052 may be disposed in a region of the outer surface 1024 of the first connection terminal 1164-1, which is located between the adjacent ones of the concave portions 1025-1 to 1025-*m* (where m is a natural number greater than 1), and in the concave portions 1025-1 to 1025-*m* (where m is a natural number greater than 1).

The second conductive layer 1052 may include concave portions 1026-1 and 1026-2, which are disposed so as to correspond to the concave portions 1025-1 to 1025-*m* (where m is a natural number greater than 1).

For example, a first region S11 of the second conductive layer 1052, which is disposed in the concave portions 1025-1 to 1025-*m* (where m is a natural number greater than 1), may have a structure that is indented from the surface of the second conductive layer 1052, e.g. from an upper surface 1052a of the second conductive layer 1052.

The thickness P1 of the first region S11 of the second conductive layer 1052, which is disposed in each of the concave portions 1025-1 to 1025-*m* (where m is a natural number greater than 1), may be less than the depth of the center of a corresponding concave portion.

For example, the thickness P1 of the first region S11 may be less than the depth of the center of each of the concave portions 1025-1 to 1025-*m* (where m is a natural number greater than 1).

For example, the thickness P1 of the first region S11 of the second conductive layer 1052 may be gradually increased from the edge thereof to the center thereof.

The thickness of the first region S1 of the second conductive layer 1052, which corresponds to the center of each of the concave portions, may be different from the thickness P2 of the second region S21 of the second conductive layer 1052, which is located between adjacent ones of the concave portions 1025-1 to 1025-*m* (where m is a natural number greater than 1).

For example, the thickness of the center of the first region S11 of the second conductive layer 52 may be greater than the thickness P2 of the second region S21 of the second conductive layer 52.

Since the surface roughness of the concave portions 1025-1 to 1025-*m* (where m is a natural number greater than 1) is larger than the surface roughness of the second inner frame 1161, the connection portion 1163 and the second outer frame 1162 of the first lower spring 1160-1, the thickness of the first region S11, which is formed in the concave portions 1025-1 to 1025-*m* (where m is a natural number greater than 1), may be greater than the thickness of the second region S21, and thus solderability and wettability may be improved.

The thickness P1 of the first region S11 of the second conductive layer 1052 may be less than the depth D2 of the concave portions 1025-1 to 1025-*m* (where m is a natural number greater than 1) (P1<D2). The reason for this is to cause the first region S11 of the second conductive layer 52 to include a recess. Since the second conductive layer 1052 includes a recess, the contact area with the solder during the soldering may be increased, and thus solderability and wettability may be improved, thereby increasing coupling force between the first connection terminal 1164-1 of the lens moving apparatus 1100 and an external element, such as a circuit board of a camera module.

The second connection terminal 1164-2 may have the same structure as the first connection terminal 1164-1, as described with reference to FIGS. 30a, 30b and 31.

Figure 32:
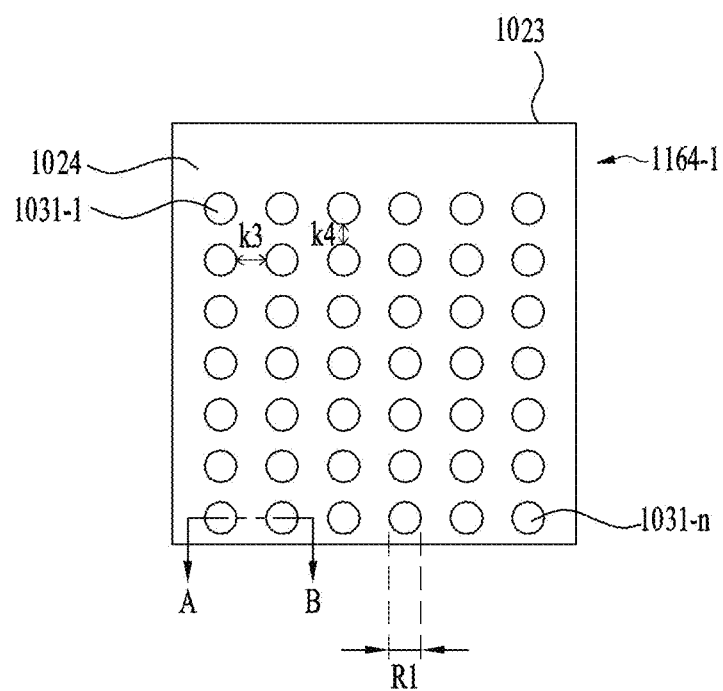
FIG. 32 illustrates a first connection terminal according to another embodiment.

FIG. 32 illustrates a first connection terminal 1164-1' according to another embodiment.

Referring to FIG. 32, the first connection terminal 1164-1' may include a plurality of concave portions 1031-1 to 1031-*n* (where n is a natural number greater than 1), and each of the concave portions 1031-1 to 1031-*n* (where n is a natural number greater than 1) may take the form of a dot. In the embodiment shown in FIG. 32, each of the concave portions takes the form of a circular dot. However, the disclosure is not limited thereto. Each of the concave portions may be formed in a polygonal shape, an elliptical shape, or the like.

For example, the concave portions 1031-1 to 1031-*n* (where n is a natural number greater than 1) may be arranged in the form of a matrix having rows and columns.

The first spacing distance K3 between two adjacent concave portions in a row direction may be constant, and the second spacing distance K4 between two adjacent concave portions in a column direction may be constant. The diameters R1 of the concave portions 1031-1 to 1031-*n* (where n is a natural number greater than 1) may be the same as each other.

For example, the diameters R1 of the concave portions 1031-1 to 1031-*n* (where n is a natural number greater than 1) may be the same as each other.

For example, the diameter R1 of each of the concave portions 1031-1 to 1031-*n* (where n is a natural number greater than 1) may range from 0.05 mm to 0.09 mm. Alternatively, in another embodiment, the diameter R1 of each of the concave portions may range, for example, from 0.06 mm to 0.08 mm.

The reason for arranging the concave portions with a constant spacing distance is to cause a solder to be evenly applied to the first connection terminal 1164-1', thereby increasing coupling force between the first connection terminal 1164-1' and an external element, such as a circuit board of a camera module.

In another embodiment, the diameter of at least one of the concave portions may be different from the diameters of the remaining ones of the concave portions, and the concave portions may be arranged irregularly or randomly.

The cross-section taken in the direction AB in FIG. 32 may be the same as illustrated in FIGS. 30*b* and 31, and the description made with reference to FIGS. 30*b* and 31 may be applied to the embodiment shown in FIG. 32.

The automatic soldering process, which performs soldering using equipment, may cause more soldering defects than the manual soldering process. Since the first and second connection terminals 1164-1, 1164-2, 1164-1*a* and 1164-1' according to the embodiment have excellent solderability, soldering defects may be decreased even when the automatic soldering process is performed.

Each of the first and second connection terminals 1164-1 and 1164-2 of the first and second lower springs 1160-1 shown in FIGS. 28 and 29 is formed integrally with the second inner frame 1161, the second outer frame 1162 and the connection portion 1163. However, the disclosure is not limited thereto.

In another embodiment, each of the first and second lower springs may include only the second inner frame 1161, the second outer frame 1162 and the connection portion 1163, and each of the first and second connection terminals may be separately disposed on the outer surface of the base 1210.

In this case, one end of each of the first and second connection terminals, which are disposed on the outer surface of the base 1210, may be coupled or bonded to the second outer frame of a corresponding one of the first and second lower springs using a conductive adhesive member, e.g. using soldering.

In another embodiment, the description of the first connection terminals 1164-1, 1164-1*a* and 1164-1' shown in FIGS. 30*a* to 32 may be applied to the first and second connection terminals 164-1 and 164-2 shown in FIG. 8.

Figure 33:
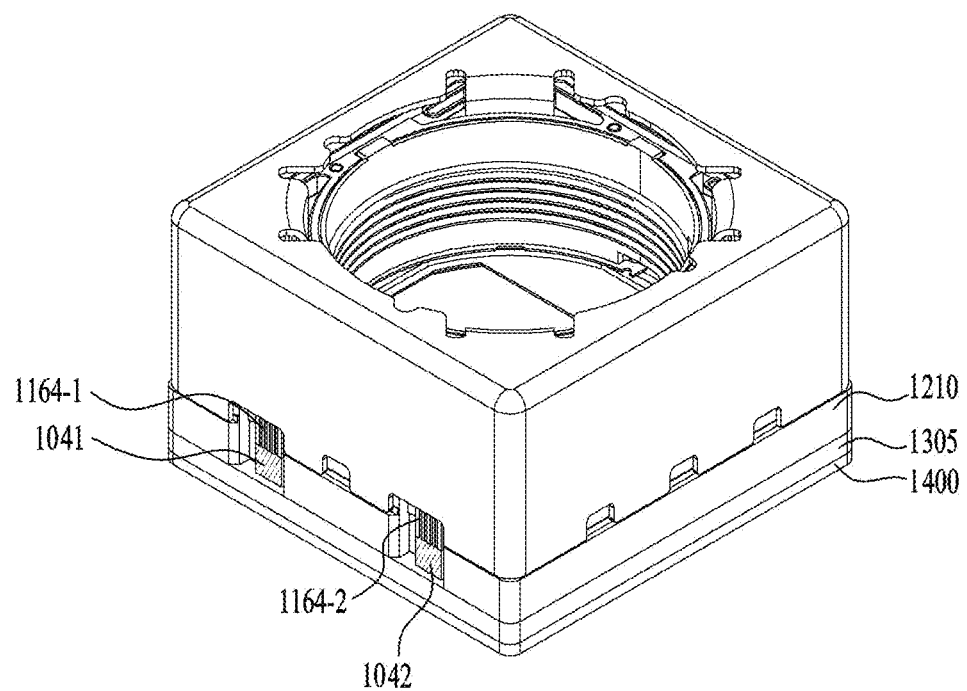
FIG. 33 illustrates a perspective view of a camera module according to an embodiment.
Figure 34:
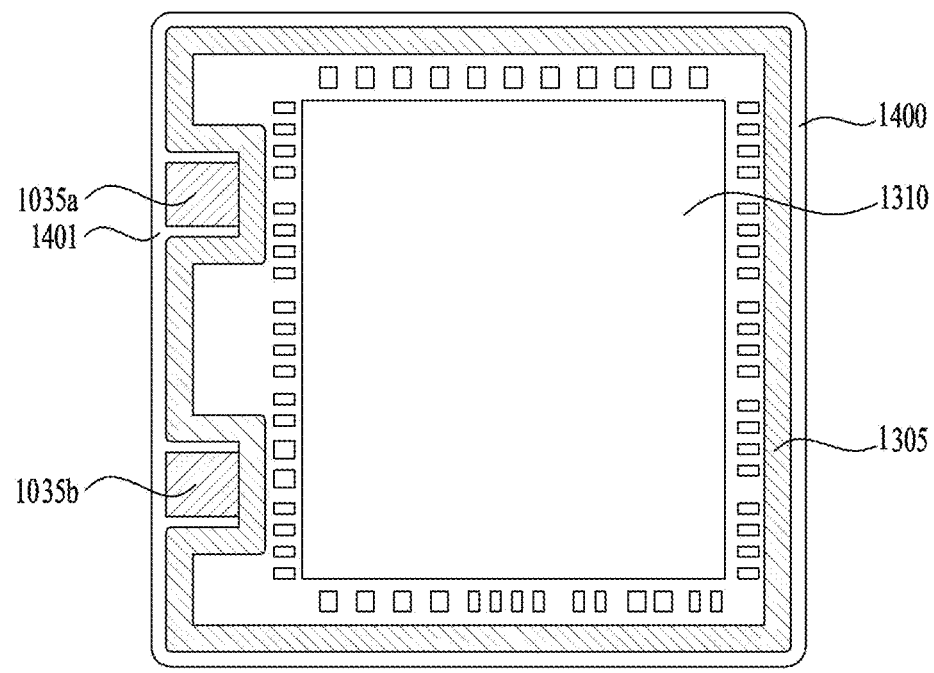
FIG. 34 illustrates the holder, the image sensor and the circuit board shown in FIG. 33.
Figure 35:
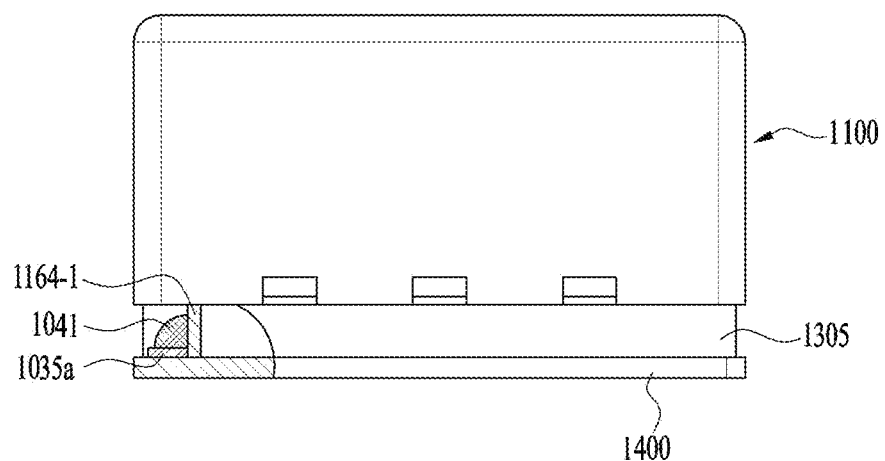
FIG. 35 illustrates a soldering portion of the camera module shown in FIG. 33.

FIG. 33 illustrates a perspective view of a camera module according to an embodiment, FIG. 34 illustrates a holder 1305, an image sensor 1310 and a circuit board 1400 shown in FIG. 33, and FIG. 35 illustrates a soldering portion 1041 of the camera module shown in FIG. 33.

Referring to FIG. 33, the camera module includes a lens moving apparatus 1100, a holder 1305, an image sensor 1310, a circuit board 1400, and first and second soldering portions 1041 and 1042.

The holder 1305 may be disposed under the base 1210 of the lens moving apparatus 1100.

The circuit board 1400 is disposed under the holder 1300. The image sensor 1310 may be disposed on the circuit board 1400. The image sensor 1310 may receive the image included in the light incident through the lens moving apparatus 1100, and may convert the received image into an electric signal.

Various circuits and elements may be provided on the circuit board 1400 in order to convert the image formed on the image sensor 1310 into an electric signal and to transmit the electric signal to an external device.

The camera module may further include a controller disposed on the circuit board 1400.

The controller may include a driver for supplying a driving signal for driving the coil 1120 to first and second pads 1035*a* and 1035*b* of the circuit board 1400, and a sensing unit for generating control signals for controlling pixels of the image sensor and converting an image signal sensed by the image sensor into a digital signal.

The camera module may further include a filter (not illustrated) disposed between the lens moving apparatus 1100 and the image sensor 1310. The filter may be installed to the holder 1305 so as to face the image sensor 3110 in the optical-axis direction, and the holder 1305 may include a protruding portion (not illustrated) on which the filter is seated. Here, the filter may serve to block the light within a specific frequency band of the light that passes through the lens from being incident on the image sensor 1310. For example, the filter may be an infrared-light blocking filter, without limitation thereto.

The camera module may further include a motion sensor, which outputs rotational angular velocity information based on the motion of the camera module.

In addition, the camera module may further include a connector, which is electrically connected to the circuit board 1400 and which includes a port for electrical connection to an external device.

The holder 1305 may be secured to the lower surface of the base 1210 of the lens moving apparatus 1100, and may have therein a hollow region through which the pixels of the image sensor are exposed.

As illustrated in FIG. 34, at least one side surface of the holder 1305 may be bent so as to expose the first and second pads 1035*a* and 1035*b* provided on the upper surface of the circuit board 400.

The circuit board 1400 may be secured to the lower end of the holder 1305, and the first and second pads 1035*a* and 1035*b* may be provided on the upper surface of the circuit board 1400. The first and second pads 1035*a* and 1035*b* of the circuit board 1400 may be disposed at positions corresponding to the first and second connection terminals 1164-1 and 1164-2 of the lens moving apparatus 1100.

Referring to FIG. 35, the first soldering portion 1041 couples or bonds the first connection terminal 1164-1 of the lens moving apparatus 1100 and the first pad 1035*a* of the circuit board 1400 to each other.

For example, the first soldering portion 1041 may be injected into at least one of the concave portions 1025-1 to 1025-*m* or 1026-1 and 1026-2 of the first connection terminal 164-1.

For example, the first soldering portion 1041 may be completely or partially injected into the concave portions 1025-1 to 1025-*m* or 1026-1 and 1026-2 of the first connection terminal 164-1.

Further, the first soldering portion 1041 may cover the upper surface of the first pad 1035*a* of the circuit board 1400.

In addition, the second soldering portion 1042 couples or bonds the second connection terminal 1164-2 of the lens moving apparatus 1100 and the second pad 1035*b* of the circuit board 1400 to each other.

For example, the second soldering portion 1042 may be injected into at least one of the concave portions 1025-1 to 1025-*m* or 1026-1 and 1026-2 of the second connection terminal 164-2.

For example, the second soldering portion 1042 may be completely or partially injected into the concave portions 1025-1 to 1025-*m* or 1026-1 and 1026-2 of the second connection terminal 1164-2.

Further, the second soldering portion 1042 may cover the upper surface of the second pad 1035*b* of the circuit board 1400.

Since the first and second soldering portions 1041 and 1042 are injected into the concave portions 1025-1 to 1025-m or 1026-1 and 1026-2 provided in the first and second connection terminals 1164-1, 1164-2 and 1164-1 of the lens moving apparatus 1100, the contact area between the first and second soldering portions 1041 and 1042 and the first and second connection terminals 1164-1, 1164-2 and 1164-1a is increased. Therefore, the embodiment is capable of improving solderability and wettability and increasing coupling force between the first and second connection terminals 1164-1, 1164-2 and 1164-1a and the first and second pads 1035a and 1035b of the circuit board 4100.

In addition, the lens moving apparatus 100 according to the embodiment may be included in an optical instrument for the purpose of forming an image of an object in a space using reflection, refraction, absorption, interference, or diffraction, which are characteristics of light, for the purpose of increasing visibility, for the purpose of recording and reproduction of an image by a lens, for the purpose of optical measurement or image propagation or transmission, or the like. For example, the optical instrument according to the embodiment may include a smart phone and a portable terminal equipped with a camera.

Figure 36:
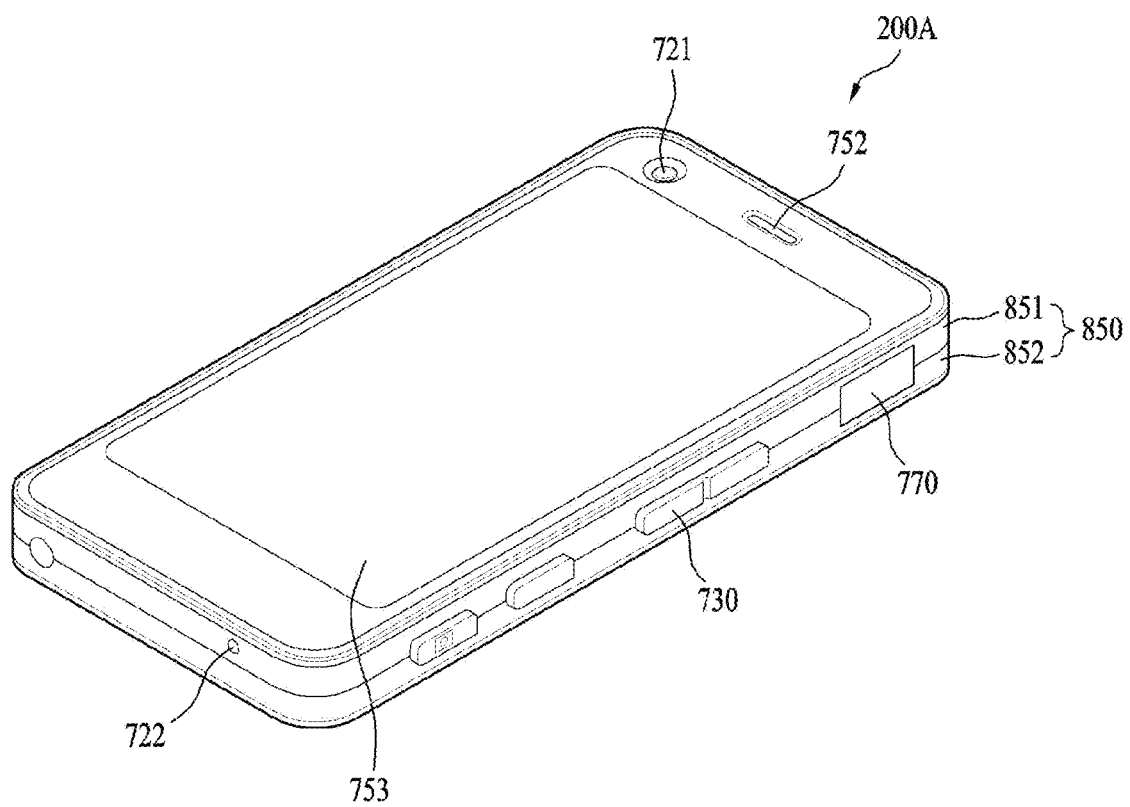
FIG. 36 illustrates a perspective view of a portable terminal according to an embodiment.
Figure 37:
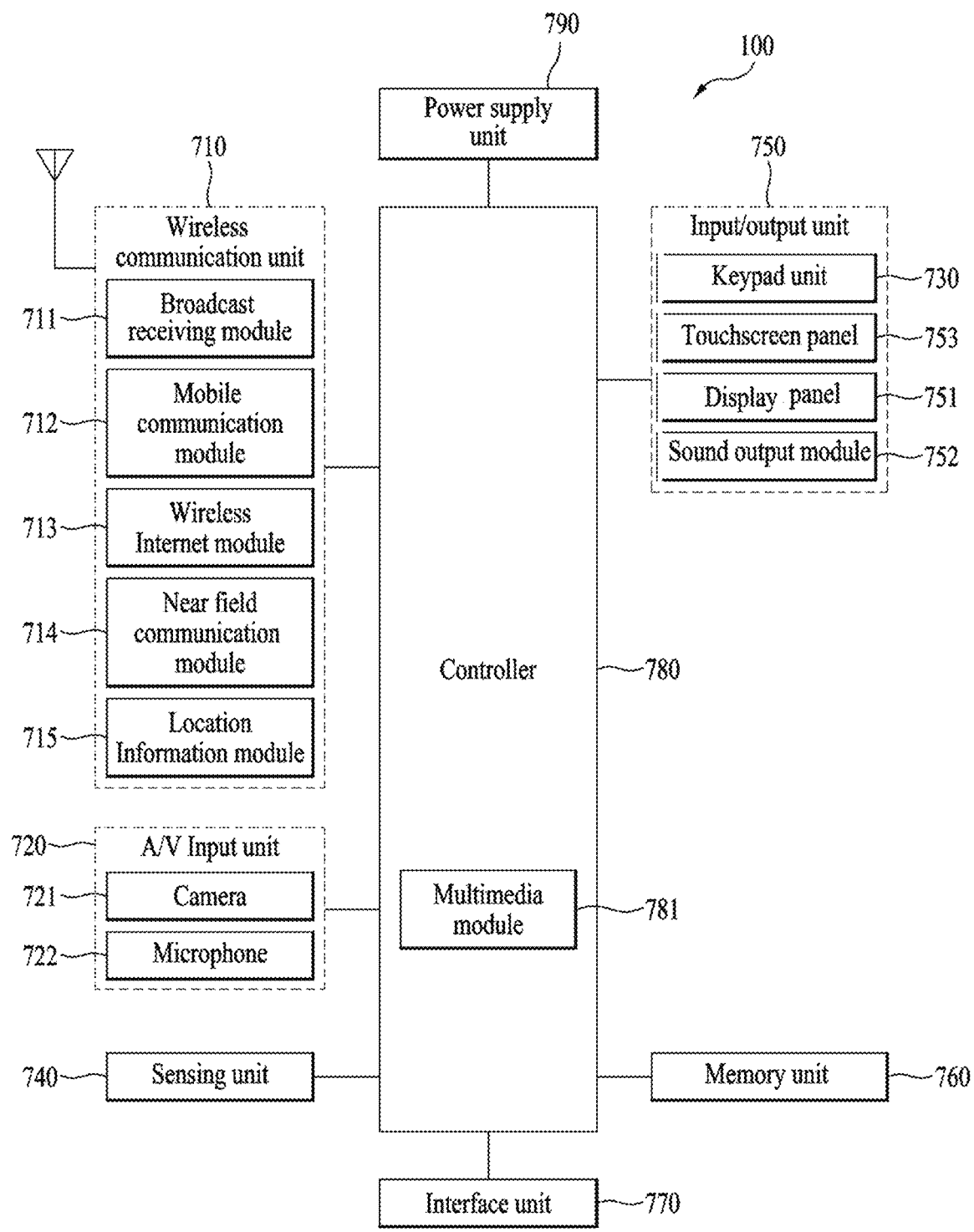
FIG. 37 illustrates the configuration of the portable terminal shown in FIG. 36.

FIG. 36 illustrates a perspective view of a portable terminal 200A according to an embodiment, and FIG. 37 illustrates the configuration of the portable terminal shown in FIG. 36.

Referring to FIGS. 36 and 37, the portable terminal 200A (hereinafter referred to as a "terminal") may include a body 850, a wireless communication unit 710, an A/V input unit 720, a sensing unit 740, an input/output unit 750, a memory unit 760, an interface unit 770, a controller 780, and a power supply unit 790.

The body 850 shown in FIG. 36 has a bar shape, without limitation thereto. The body 850 may be any of various types, such as a slide type, a folder type, a swing type, or a swivel type, in which two or more sub-bodies are coupled so as to be movable relative to each other.

The body 850 may include a case (e.g. a casing, a housing or a cover), which forms the external appearance thereof. For example, the body 850 may be divided into a front case 851 and a rear case 852. Various electronic components of the terminal may be embedded in the space formed between the front case 851 and the rear case 852.

The wireless communication unit 710 may include one or more modules that enable wireless communication between the terminal 200A and a wireless communication system or between the terminal 200A and the network in which the terminal 200A is located. For example, the wireless communication unit 710 may include a broadcast receiving module 711, a mobile communication module 712, a wireless Internet module 713, a near field communication module 714, and a location information module 715.

The audio/video (A/V) input unit 720 may serve to input an audio signal or a video signal, and may include a camera 721 and a microphone 722, for example.

The camera 721 may include the camera module according to the embodiment shown in FIG. 20 or FIG. 33.

The sensing unit 740 may sense the current state of the terminal 200A, such as the opened/closed state of the terminal 200A, the position of the terminal 200A, the presence or absence of a user touch, the orientation of the terminal 200A, or the acceleration/deceleration of the terminal 200A, and may generate a sensing signal for controlling the operation of the terminal 200A. For example, when the terminal 200A takes the form of a slide phone, the sensing unit may sense whether the slide phone is opened or closed. In addition, the sensing unit functions to sense whether or not the power supply unit 790 supplies power or whether or not the interface unit 770 is connected to an external device, for example.

The input/output unit 750 serves to generate input or output that is visual, auditory, tactile, or the like. The input/output unit 750 may generate input data for controlling the operation of the terminal 200A and may also display information processed by the terminal 200A.

The input/output unit 750 may include a keypad unit 730, a display panel 751, a sound output module 752, and a touchscreen panel 753. The keypad unit 730 may generate input data based on input to a keypad.

The display panel 751 may include a plurality of pixels, the color of which changes in response to an electric signal. For example, the display panel 751 may include at least one of a liquid crystal display, a thin-film-transistor liquid crystal display, an organic light-emitting diode, a flexible display, or a 3-dimensional (3D) display.

The sound output module 752 may output audio data received from the wireless communication unit 710 in a call signal reception mode, a call mode, a recording mode, a voice recognition mode, a broadcast reception mode, or the like, or may output audio data stored in the memory unit 760.

The touchscreen panel 753 may convert a change in capacitance caused by a user touch on a specific area of the touchscreen into an electric input signal.

The memory unit 760 may store a program for processing and controlling the controller 780 and may temporarily store input/output data (e.g. a telephone directory, a message, audio, a still image, a photograph, or a moving image). For example, the memory unit 760 may store an image captured by the camera 721, for example, a photograph or a moving image.

The interface unit 770 serves as a path for connection to an external device connected to the terminal 200A. The interface unit 770 receives data from an external device, receives power to transmit the power to each element in the terminal 200A, or allows data in the terminal 200A to be transmitted to an external device. For example, the interface unit 770 may include a wired/wireless headset port, an external charger port, a wired/wireless data port, a memory card port, a port for connecting a device equipped with an identification module, an audio input/output (I/O) port, a video input/output (I/O) port, and an earphone port.

The controller 780 may control the overall operation of the terminal 200A. For example, the controller 780 may perform a related control operation and process for a voice call, data communication, a video call, and the like.

The controller 780 may include a multimedia module 781 for multimedia playback. The multimedia module 781 may be implemented in the controller 180, or may be implemented separately from the controller 780.

The controller 780 may perform a pattern recognition process for recognizing handwriting input or drawing input performed on the touchscreen as characters and images, respectively.

The power supply unit 790 may receive external power or internal power under the control of the controller 780, and may supply the power required for the operation of respective elements.

The above described features, configurations, effects, and the like are included in at least one of the embodiments of the disclosure, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as falling within the scope of the invention.

INDUSTRIAL APPLICABILITY

Embodiments may be used in a lens moving apparatus, which is capable of inhibiting an electrical short between a second coil and a cover member and is capable of increasing coupling force between the cover member and a housing using an adhesive member, and a camera module and an optical device including the same.

The invention claimed is:

1. A lens moving apparatus comprising:
 a housing;
 a bobbin disposed in the housing;
 a first coil disposed on an outer circumferential surface of the bobbin;
 a magnet disposed on a side portion of the housing, the magnet being disposed corresponding to the first coil;
 a base disposed under the housing;
 a second coil disposed on an outer surface of the base, the second coil being configured to generate an inductive voltage due to interaction with the first coil; and
 first to fourth elastic members coupled to the bobbin and the housing, the first to fourth elastic members being disposed so as to be spaced apart from each other on an upper surface of the base,
 wherein each of the first and second elastic members comprises a first bonding portion for bonding to the first coil and a first connection terminal for electric connection to an outside,
 wherein each of the third and fourth elastic members comprises a second bonding portion for bonding to the second coil and a second connection terminal for electric connection to an outside, and
 wherein the second bonding portion and the second connection terminal are disposed on different outer surfaces of the base.

2. The lens moving apparatus according to claim 1, wherein the base comprises side portions and a corner portion disposed between two adjacent ones of the side portions, and
 wherein each of the second bonding portion and the second connection terminal is disposed on a corresponding one of outer surfaces of two side portions adjacent to the corner portion.

3. The lens moving apparatus according to claim 1, wherein each of the first to fourth elastic members comprises:
 an inner frame coupled to the bobbin;
 an outer frame coupled to the housing; and
 a connection portion connecting the inner frame and the outer frame to each other,
 wherein the first bonding portion is disposed at the inner frame, and
 wherein the second bonding portion and the first and second connection terminals are disposed at the outer frame.

4. The lens moving apparatus according to claim 3, wherein each of the second bonding portion and the first and second connection terminals is bent and extends from the outer frame toward the base and is disposed on the outer surface of the base.

5. The lens moving apparatus according to claim 4, wherein the base has a groove formed in the outer surface thereof to allow the second coil to be disposed therein, and
 wherein the second bonding portion is disposed on a region of the outer surface of the base, which is located above the groove.

6. The lens moving apparatus according to claim 5, wherein the first and second connection terminals extend to another region of the outer surface of the base, which is located below the groove.

7. The lens moving apparatus according to claim 5, wherein the base has first indented portions formed in the outer surface thereof to allow the first and second connection terminals to be respectively disposed therein, and
 wherein the base has a second indented portion formed in the outer surface thereof to allow the second bonding portion to be disposed therein.

8. The lens moving apparatus according to claim 7,
 wherein each of the first indented portions and the second indented portion comprises:
 an upper opening that is open to the upper surface of the base; and
 a lower opening that is open to a lower surface of the base.

9. The lens moving apparatus according to claim 4, wherein the first connection terminal of each of the first and second elastic members is disposed on a first outer surface of the base,
 wherein the second connection terminal of each of the third and fourth elastic members is disposed on a second outer surface of the base, and
 wherein the first outer surface of the base and the second outer surface of the base are located opposite each other.

10. The lens moving apparatus according to claim 9, wherein the second bonding portion of the third elastic member is disposed on a third outer surface of the base,
 wherein the second bonding portion of the fourth elastic member is disposed on a fourth outer surface of the base, and
 wherein the third outer surface of the base and the fourth outer surface of the base are located opposite each other.

11. The lens moving apparatus according to claim 10, wherein the second coil has a ring shape comprising a straight portion and a curved portion.

12. The lens moving apparatus according to claim 11, wherein the straight portion of the second coil is disposed between the first connection teminals of the first and second elastic members and between the second connection terminals of the third and fourth elastic members.

13. The lens moving apparatus according to claim 11, wherein the first connection terminals of the first and second elastic members and the second connection terminals of the third and fourth elastic members overlap the curved portion of the second coil in a first horizontal direction, and the first horizontal direction is a direction that is perpendicular to the first outer surface or the second outer surface of the base.

14. The lens moving apparatus according to claim 13, wherein the first connection terminals and the second connection terminals overlap the straight portion of the second coil in a second horizontal direction, and the second horizontal direction is a direction that is perpendicular to an optical axis and parallel to the first outer surface or the second outer surface of the base.

15. The lens moving apparatus according to claim 11, wherein the second bonding portions of the third and fourth elastic members overlap the curved portion of the second coil in a first horizontal direction, and the first horizontal direction is a direction that is perpendicular to the first outer surface or the second outer surface of the base.

16. The lens moving apparatus according to claim 15, wherein the second bonding portions of the third and fourth elastic members overlap the straight portion of the second coil in a second horizontal direction, and the second horizontal direction is a direction that is perpendicular to an optical axis and parallel to the first outer surface or the second outer surface of the base.

17. The lens moving apparatus according to claim 9, wherein a width of a first region of the outer frame is greater than a width of a first region of the outer frame and a width of a third region of the outer frame, wherein the second region is a region to which the second connection terminal is connected, the third region is a region to which the second bonding portion is connected, and the first region is a region that connects the second region and the third region.

18. The lens moving apparatus according to claim 1, wherein when a driving signal is provided to the first coil, the driving signal includes an alternating current signal, and wherein the inductive voltage of the second coil is configured to be generated based on the driving signal.

19. A camera module comprising:
a lens;
a lens moving apparatus for moving the lens according to claim 1; and
an image sensor.

20. A lens moving apparatus comprising:
a housing;
a bobbin disposed in the housing;
a first coil disposed on the bobbin;
a magnet disposed on the housing;
a base disposed under the housing;
a second coil disposed on an outer surface of the base; and
an elastic member coupled to the bobbin and the housing and disposed on an upper surface of the base,
wherein when a driving signal is provided to the first coil, the driving signal includes an alternating current signal, and the second coil is configured to generate an inductive voltage due to interaction with the first coil,
wherein the elastic member comprises a first elastic member coupled to the first coil and a second elastic member coupled to the second coil,
wherein the second elastic member comprises;
a bonding portion disposed on a first outer side surface of the base for bonding to the second coil; and
a terminal disposed on a second outer side surface of the base for electric connection to an outside.

* * * * *